US011060617B2

(12) United States Patent
Warashina et al.

(10) Patent No.: US 11,060,617 B2
(45) Date of Patent: Jul. 13, 2021

(54) CONTROL VALVE AND METHOD FOR MANUFACTURING CONTROL VALVE

(71) Applicant: HAMANAKODENSO CO., LTD., Kosai (JP)

(72) Inventors: Tomoaki Warashina, Kosai (JP); Takao Ishida, Kosai (JP)

(73) Assignee: HAMANAKODENSO CO., LTD., Kosai (JP)

(*) Notice: Subject to any disclaimer, the term of this patent is extended or adjusted under 35 U.S.C. 154(b) by 0 days.

(21) Appl. No.: 16/459,727

(22) Filed: Jul. 2, 2019

(65) Prior Publication Data

US 2020/0011429 A1 Jan. 9, 2020

(30) Foreign Application Priority Data

Jul. 5, 2018 (JP) .............................. JP2018-128495

(51) Int. Cl.
*F16K 1/36* (2006.01)
*F16K 31/06* (2006.01)
*B29C 45/00* (2006.01)
*B29C 45/27* (2006.01)
(Continued)

(52) U.S. Cl.
CPC ............ *F16K 1/36* (2013.01); *B29C 45/0005* (2013.01); *B29C 45/0025* (2013.01); *B29C 45/0053* (2013.01); *B29C 45/2708* (2013.01); *F16H 61/0276* (2013.01); *F16K 31/0655* (2013.01); *B29C 2045/0027* (2013.01);
(Continued)

(58) Field of Classification Search
CPC ............ F16K 31/0603; F16K 31/0624; F16K 31/0627; F16K 31/0655; F16K 31/0693; F16K 31/0686; F16K 31/0675; F16K 31/42; F16K 39/022; Y10T 137/87708; Y10T 137/87772; Y10T 137/87217; Y10T 137/87209; Y10T 137/86622; F16H 61/009; F16H 2061/0253; F16H 2061/0258; F01L 2001/3443
See application file for complete search history.

(56) References Cited

U.S. PATENT DOCUMENTS

| 5,139,227 A * | 8/1992 | Sumida ............... F16K 31/0655 |
| | | 251/129.08 |
| 2017/0122455 A1* | 5/2017 | Warashina ............. F16K 3/246 |
| 2018/0195635 A1 | 7/2018 | Warashina et al. |

FOREIGN PATENT DOCUMENTS

JP 2017-082917 A 5/2017

OTHER PUBLICATIONS

U.S. Appl. No. 16/459,688, filed Jul. 2, 2019, Warashina et al.

* cited by examiner

*Primary Examiner* — Hailey K. Do
(74) *Attorney, Agent, or Firm* — Harness, Dickey & Pierce, P.L.C.

(57) ABSTRACT

A control valve includes a housing, a valve body arranged in a valve chamber of the housing, and a support portion slidably supporting an outer surface of the valve body in the valve chamber. The valve body is slidable on the support portion between an open position at which an outlet port is open and a closed position at which a seat surface of the valve body closes the outlet port. The valve body includes a skin layer forming the outer surface of the valve body, and a core layer under the skin layer. The outer surface of the valve body, other than the seat surface and a slidable area, includes a core exposed portion where the core layer is exposed without being covered with the skin layer.

8 Claims, 11 Drawing Sheets

(51) Int. Cl.
*F16H 61/02* (2006.01)
*B29L 31/00* (2006.01)
(52) U.S. Cl.
CPC ............... *B29C 2045/0077* (2013.01); *B29L 2031/7506* (2013.01); *F16H 2061/0279* (2013.01)

CONTROL VALVE AND METHOD FOR MANUFACTURING CONTROL VALVE

CROSS REFERENCE TO RELATED APPLICATION

The present application claims the benefit of priority from Japanese Patent Application No. 2018-128495 filed on Jul. 5, 2018, The entire disclosure of the above application is incorporated herein by reference.

TECHNICAL FIELD

The present disclosure relates to a control valve and a method for manufacturing a control valve.

BACKGROUND

A control valve controls the flow of the working fluid flowing from an upstream passage to a downstream passage through a valve chamber.

SUMMARY

According to a first aspect of the present disclosure, a control valve controls a flow of a working fluid. The control valve includes a housing, an inlet passage, a valve body and a support portion. The housing includes a tubular end portion inserted into a mounting hole of a passage formation member, and a valve chamber inside the tubular end portion. The passage formation member has an upstream passage through which the working fluid flows toward the housing, and a downstream passage into which the working fluid flows out of the housing. The inlet passage is provided inside or in the tubular end portion, and the upstream passage communicates with the valve chamber through the inlet passage. The valve body has a tubular or columnar shape, is provided in the valve chamber and is movable in an axial direction along which a center line of the valve body extends. The valve body includes a seat surface which is one end face for closing a valve port communicating with the valve chamber. The valve body is movable between an open position at which the valve port is open to permit a flow of the working fluid into the downstream passage from the valve chamber and a closed position at which the valve port is closed by the seat surface to block the flow. The support portion is provided in the valve chamber and supporting the valve body to be slidable in the axial direction. An outer surface of the valve body includes a sliding surface sliding on an inner peripheral surface of the support portion, and a connection surface connecting the seat surface and the sliding surface and being at a position not sliding on the inner peripheral surface. The valve body, which is a resin molded product, has a skin layer providing the outer surface and a core layer under the skin layer. The valve body includes a core exposed portion where the core layer is exposed without being covered with the skin layer and forms a part of the outer surface is provided on the connection surface without being provided on the seat surface and the sliding surface.

According to a second aspect of the present disclosure, in a method for manufacturing a control valve that controls a flow of a working fluid, a mold device including a cavity and a gate connected to the cavity is prepared. A molded body is molded by suppling molten resin from the gate to the cavity in the mold device. The molded body includes a tubular or columnar valve body and a gate portion. An outer surface of the valve body includes a seat surface which is one end face of the valve body, a connection surface extending from the seat surface in an axial direction of the valve body, and a sliding surface extending from the connection surface away from the seat surface in the axial direction. The gate portion is where the molten resin remaining in the gate has solidified, and the gate portion is connected to the connection surface without being connected to the seat surface and the sliding surface. The gate portion is cut off from the molded body to obtain the valve body with a gate trace remaining on the connection surface due to the cutting of the gate portion. A housing having a valve chamber is prepared. The valve body is placed in the valve chamber such that the sliding surface slides on an inner peripheral surface of a support portion supporting the valve body to be slidable in the axial direction while the connection surface does not slide on the inner peripheral surface of the support portion. A drive unit that moves the valve body in the axial direction is prepared. The drive unit is attached to the housing such that the valve body is movable between an open position at which a valve port communicating with the valve chamber is open, and a closed position at which the seat surface closes the valve port.

According to a third aspect of the present disclosure, a control valve controls a flow of a working fluid. The control valve includes a housing, a valve body and a support member. The housing includes a tubular end portion, a valve chamber inside the tubular end portion, and an outflow port through which the working fluid flows out of the valve chamber. The valve body is provided in the valve chamber and having a tubular or columnar shape. The valve body includes a seat surface on one end face of the valve body. The support member includes a support portion provided in the valve chamber and having an inner peripheral surface supporting an outer surface of the valve body to be slidable in an axial direction of the valve body. The valve body is slidable in the axial direction on the inner peripheral surface of the support portion between an open position at which the outflow port is open and a closed position at which the seat surface contacts the housing to close the outflow port. The valve body, which is a resin molded product, includes a skin layer forming the outer surface of the valve body, and a core layer under the skin layer. The outer surface of the valve body includes a core exposed portion where the core layer is exposed without being covered with the skin layer. The core exposed portion is at a position outside the seat surface and a slidable area of the outer surface which is slidable on the inner peripheral surface of the support portion.

DETAILED DESCRIPTION

Figure 1:
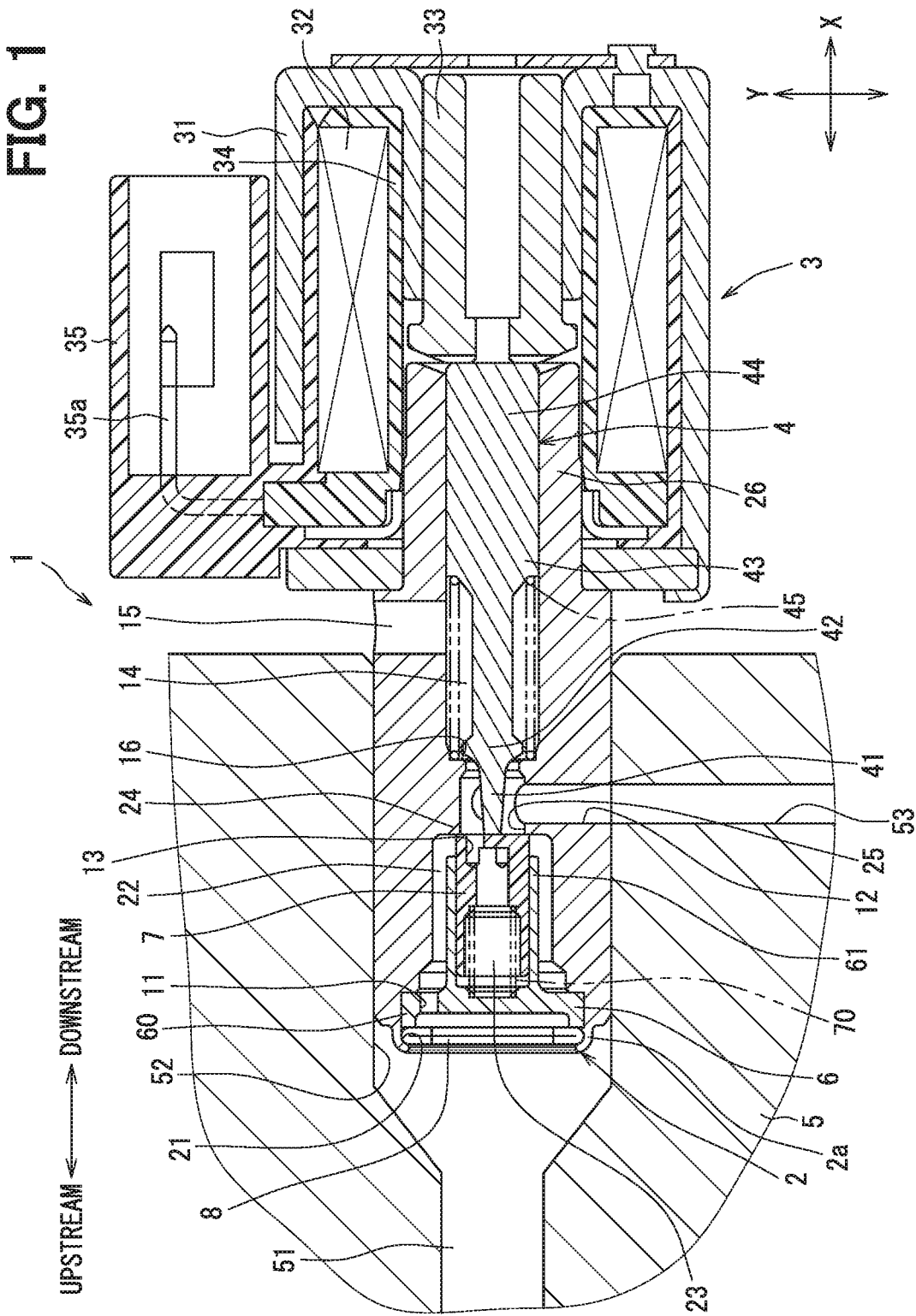
FIG. 1 is a cross-sectional view of an electromagnetic valve according to at least one embodiment.

Embodiments of the present disclosure will be described hereinafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

Figure 2:
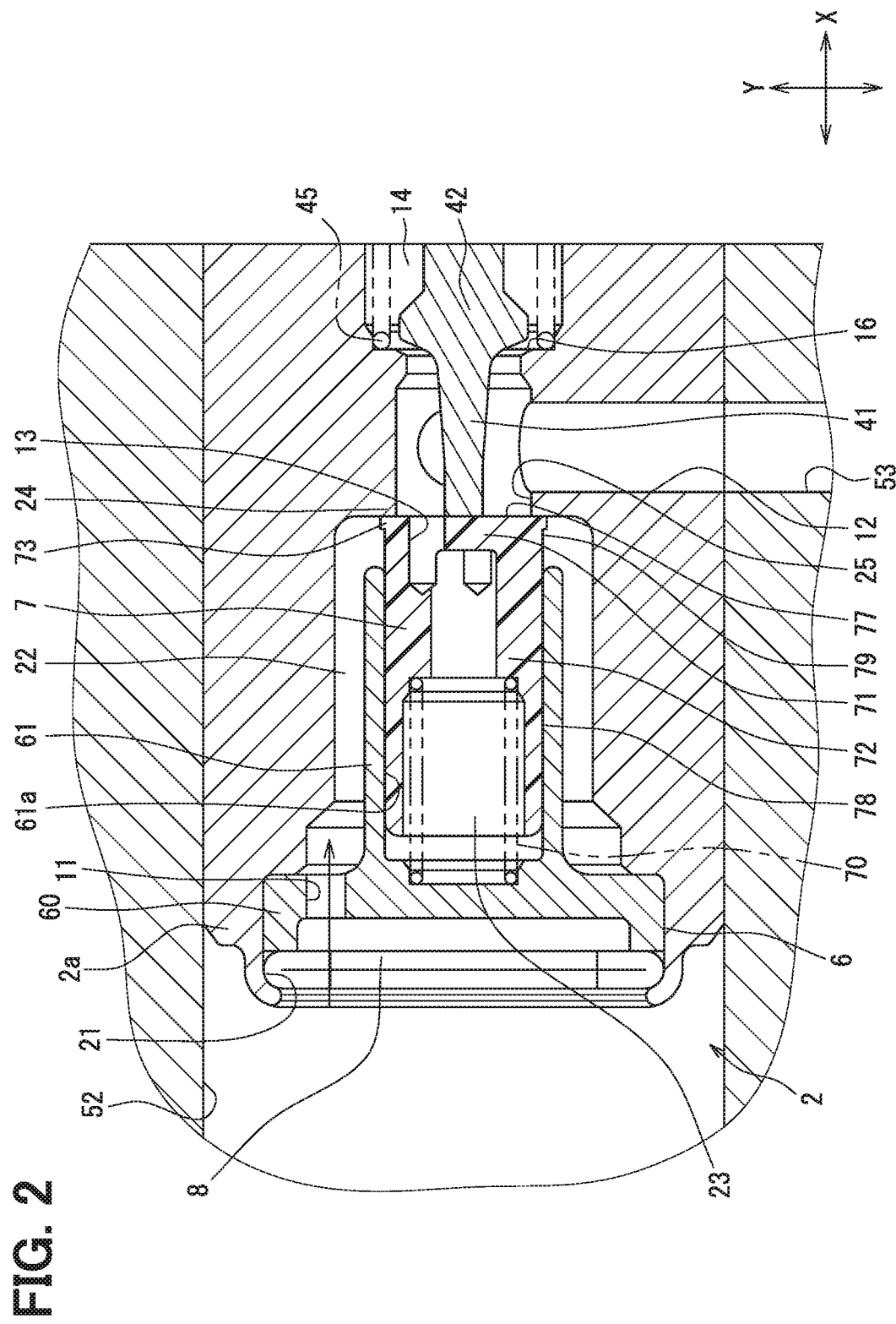
FIG. 2 is an enlarged view of a periphery of a valve body in FIG. 1.

An electromagnetic valve 1 according to a first embodiment will be described with reference to FIGS. 1 to 5. FIG. 1 shows a schematic configuration of an entire electromagnetic valve 1 which is mounted in, for example, an automatic transmission system of an automobile and switches an oil path for transmission control. The electromagnetic valve 1 shown in FIGS. 1 and 2 is configured to include a flow channel control unit that is housed in a housing 2, and an electromagnetic solenoid unit 3 that is integrally connected to the flow passage control unit. The electromagnetic valve 1 corresponds to a control valve, and the electromagnetic valve 1 may be referred to as a valve device.

The flow channel control unit includes a tubular housing 2 having a tubular end portion 2a fitted into a mounting hole 52. The mounting hole 52 provides a columnar passage inside the automatic transmission device or a passage formation member 5 on the automatic transmission device side. The tubular housing 2 extends in an axial direction of the mounting hole 52. An upstream passage 51, which is an oil inflow passage through which a pressure-regulated oil flows, is provided in the passage formation member 5 as an example of a working fluid, and the upstream passage 51 communicates with an inlet passage 11, The inlet passage 11 is a passage for communicating the upstream passage 51 with a valve chamber 22. The number and the opening shape of the inlet passage 11 are not limited. As a passage cross-sectional shape of the inlet passage 11, a rectangular shape, a circular shape, an arc shape, or a slit shape can be adopted.

The housing 2 has a shaft holding portion 26 located on the side axially opposite to a tubular end portion 2a that is fitted into the mounting hole 52. The shaft holding portion 26 holds a shaft 4 so as to be displaceable in the axial direction, and is assembled to the externally fitted electromagnetic solenoid unit 3. The electromagnetic valve 1 is attached to the automatic transmission device by fitting the tubular end portion 2a of the housing 2 into the mounting holes 52 of the passage formation member 5 and fixing the outflow port 12 and the downstream passage 53 in a connected condition.

Inside the housing 2, a filter chamber 21 is provided at a position close to a tip. The filter chamber 21 is a chamber in which an oil from the automatic transmission side first flows into the electromagnetic valve 1, and a filter member 8 for filtering the oil, which is a working fluid, is mounted in the filter chamber 21 so as to cover an entire cross section of the passage.

The housing 2 is provided with the valve chamber 22 that communicates with the inlet passage 11 on the downstream side, and a downstream valve port 25 is opened at the downstream end portion of the valve chamber 22. The housing 2 is provided with the internal discharge passage 14 which communicates with the external discharge passage 15 downstream side of the downstream valve port 25 which communicates with the valve chamber 22. Furthermore, the housing 2 is provided with an outflow port 12 which extends laterally so as to cross the axial direction between the downstream valve port 25 and the internal discharge passage 14. The outflow port 12 is connected to a downstream passage 53 as an oil outflow passage provided in the passage formation member 5 and communicating with a valve of the transmission.

The filter member 8 is a disc like member located at the most upstream of the oil flow inside the tubular end portion 2a. The filter member 8 has a net portion which is disposed at a position facing an upstream side in the inlet passage 11. The filter member 8 has a frame portion provided over an entire circumference so as to surround a periphery of a net portion. The net portion is formed, for example, by etching a central portion of a disc like plate material. The remaining portion of the plate material that has not been etched configures a frame portion formed around the net portion. The filter member 8 can also be manufactured by bonding, welding, or the like a net portion and a frame portion, which are separate members.

The housing 2 is provided with a valve seat 24 with which a seat surface 77 of the valve body 7 can come into contact. The valve seat 24 forms a peripheral portion of the downstream valve port 25 as a through hole which passes through the central portion of the valve chamber 22 in the axial direction. The valve chamber 22 includes a space located between the inlet passage 11 and the downstream valve port 25, and accommodates the support portion 61 of the support member 6 and the valve body 7. In the present embodiment, a direction in which a center line CL (refer to FIG. 3) of the valve body 7 extends is referred to as an axial direction X, and a direction perpendicular to the axial direction X is referred to as a radial direction Y. The axial direction X coincides with the axial direction of the mounting hole 52.

With the operation of the electromagnetic valve 1, the position of the valve body 7 in the axial direction X is controlled between an open position in which the downstream valve port 25 is opened and a closed position in which the downstream valve port 25 is closed. When the valve body 7 is at the open position, the seat surface 77 is separated from the valve seat 24, thereby allowing the working fluid to flow from the valve chamber 22 to the downstream passage 53. The valve body 7 also prevents the working fluid from flowing through by allowing the seat surface 77 to come in contact with the valve seat 24 when the valve body 7 is at the closed position.

The valve body 7 has a tubular wall portion 72 having a tubular shape and a bottom portion 71 provided at one end of the tubular wall portion 72, and is a tubular body as a whole. In the valve body 7, an end located on the opposite side to the bottom portion 71 is opened, and a downstream end face, which is an end face on the side where the bottom portion 71 is provided, is the seat surface 77.

The bottom portion 71 is provided with a pressure release passage 13 which passes through a portion other than the central portion which is in contact with the shaft 4. The pressure release passage 13 configures a passage for communicating the spring chamber 23, which is an inner chamber of the valve body 7, with the downstream valve port 25 when the valve body 7 is at the closed position.

A support member 6 is accommodated inside the tubular end portion 2a. The support member 6 has a mounting portion 60, which is a fixed portion fixed inside the tubular end portion 2a, and a support portion 61 that extends toward the downstream side from the mounting portion 60 and supports the valve body 7 so as to be slidable in the axial direction X, The mounting portion 60 is a flange-like portion that protrudes radially outward at an upstream end portion of the support portion 61. The mounting portion 60 is fixed to the tubular end portion 2a in such a manner that a peripheral edge of the mounting portion 60 is inscribed in the tubular end portion 2a and an inner wall of the tubular end portion 2a is partially crimped. Therefore, multiple crimping portions for fixing the mounting portion 60 to the housing 2 are provided on the inner wall of the tubular end portion 2a. One or more inlet passages 11 pass through the mounting portion 60 in the axial direction X closer to the center than the multiple crimping portions.

The filter member 8 is integrally fixed to the mounting portion 60 of the support member 6 by, for example, a crimping portion provided at the tip portion of the tubular end portion 2a. Multiple crimping portions are arranged in a circumferential direction around the net portion. The crimping portion is obtained by deforming a protrusion portion protruding from an end face of the mounting portion 60 coming in contact with the frame portion by crimping. In other words, the filter member 8 and the mounting portion 60 are integrally integrated with each other in a state where the protrusion portion passing through a hole provided in the frame portion, and are disposed inside the tubular end portion 2a.

The support portion 61 of the support member 6 is a cylinder portion extending along the axial direction X from the mounting portion 60 to the downstream valve port 25 side coaxially with the mounting portion 60. The support portion 61 supports a tubular wall portion 72 of the valve body 7 which is coaxially inscribed. The tubular valve body 7 is slidable in the axial direction X with respect to the support portion 61 while the inner wall surface 61a of the support portion 61 and the outer wall surface of the tubular wall portion 72 are in contact with each other, and is coaxial with the support portion 61. The outer wall surface of the tubular wall portion 72 includes a sliding surface 78 that slides on the inner wall surface 61a of the support portion 61. Further, the valve body 7 is pushed toward the downstream valve port 25 upon receiving a spring force in the axial direction X from a spring 70, which is an example of an urging member. The spring 70 is interposed between the mounting portion 60 and a stepped portion formed in the tubular wall portion 72. In the support portion 61, the inner wall surface 61a corresponds to an inner peripheral surface.

At the open position in which the valve body 7 is separated from the valve seat 24, the working fluid that has passed through the upstream passage 51 passes through the inlet passage 11 and flows into the valve chamber 22. At that time, a pressure in the valve chamber 22 is increased by an inflow of the working fluid. Therefore, since the fluid pressure of the valve chamber 22 acts on the valve body 7, the fluid pressure also acts on the spring chamber 23 inside the valve body 7. The pressure acting on the spring chamber 23 acts on a side surface of the tubular wall portion 72 of the valve body in the valve chamber 22, and further acts on the spring chamber 23 through the sliding portion with the support portion 61. Thus, the support member 6 guides a reciprocating movement in the axial direction X of the valve body 7 which is subjected to the spring force of the spring body 70, the acting force from the shaft 4 and the fluid pressure. Therefore, since the valve body 7 has the pressure release passage 13 penetrating through the bottom portion 71, the pressure acting on the spring chamber 23, that is, the inner chamber of the tubular body is released to the downstream passage 53 through the pressure release passage 13, and the internal pressure in the inner chamber of the tubular body can be reduced. As a result, even if a high fluid pressure acts on the valve chamber 22, the pressure applied to the valve body 7 in the axial direction X can be reduced.

An oil having a pressure higher than that of a fuel vapor flows through the electromagnetic valve 1 as a working fluid. In a state where at least the tubular end portion 2a of the housing 2 is fitted into the mounting hole 52, the outer surface of the housing 2 and the inner surface of the mounting hole 52 are in contact with each other. As a result, the sealing property is ensured, and a fluid leakage from a space between the outer surface of the housing 2 and the inner surface of the mounting hole 52 is reduced.

The valve body 7 is displaced in the axial direction X by the pressing force of the shaft 4 operated in the axial direction X by the electromagnetic solenoid unit 3, and is switched between a closed position in which the valve body 7 is seated on the valve seat 24 around the downstream valve port 25 and an open position in which the valve body 7 is separated from the valve seat 24. At the closed position, a communication between the outflow port 12 and the upstream passage 51 is cut off, and a tapered valve portion 42 of the shaft 4 is separated from a periphery of an discharge valve port 16 to open the internal discharge passage 14, so that the communication between the downstream passage 53 and the external discharge passage 15 is permitted. At the open position, the communication between the outflow port 12 and the upstream passage 51 is permitted, and the valve portion 42 is seated around the discharge valve port 16 to close the internal discharge passage 14, so that the communication between the downstream passage 53 and the external discharge passage 15 is blocked.

The electromagnetic solenoid unit 3 disposed on a rear end of the housing 2 includes a yoke 31, a bobbin 34, a coil 32, a mover 33, a shaft 4, a spring 45, a connector 35, and the like. The electromagnetic solenoid unit 3 is a drive unit that moves the valve body 7 in the axial direction X by driving. The bobbin 34 is made of a resin material and formed into a substantially circular tubular shape, and is provided inside the yoke 31. The coil 32 is wound around an outer peripheral surface of the bobbin 34. The yoke 31 is made of a magnetic material. The yoke 31 is provided coaxially with the bobbin 34 so as to support an inner peripheral side of the bobbin 34 and cover an outer peripheral side of the coil 32. The bobbin 34 is provided coaxially with the housing 2 in a state in which a portion of the housing 2 which slidably supports the shaft 4 is accommodated inside. Like the bobbin 34, the yoke 31, the mover 33, the shaft 4, and the like are provided coaxially with the housing 2.

The mover 33 is made of a magnetic material and formed in a circular tubular shape. The mover 33 is supported by the yoke 31 so as to be capable of reciprocating in the axial direction X. In the electromagnetic solenoid unit 3, a magnetic circuit is formed by the mover 33 and the yoke 31.

A large diameter portion 44 of the shaft 4 is fixed to an end face of the mover 33 on the bottom side coaxially with the mover 33. The shaft 4 and the mover 33 are integrally reciprocally movable in the axis center direction. The shaft 4 integrally includes a small diameter tip portion 41 positioned concentrically with the downstream valve port 25, a valve portion 42 positioned in the internal discharge passage 14, and a large diameter portion 44 slidably fitted in the shaft holding portion 26 through the step portion 43. The internal discharge passage 14 is connected to an external discharge passage 15 provided on the rear end side of the housing 2. The external discharge passage 15 is a drain passage provided in the housing 2 on the tip side of the shaft holding portion 26 so as to extend in a direction perpendicular to the internal discharge passage 14.

The spring 45, which is an example of an urging member, is interposed between the step portion 43 and the peripheral edge of the discharge valve port 16. The spring 45 constantly applies an urging force for pushing the shaft 4 toward the mover 33. Further, the valve body 7 disposed in the valve chamber 22 is constantly pushed toward the downstream valve port 25 by the spring 70. In that case, when the electromagnetic solenoid unit 3 is not energized, the shaft 4 is urged by the spring force of the spring 45 and the valve body 7 is pushed toward the downstream valve port 25 by the spring force of the spring 70. As a result, the valve portion 42 opens the discharge valve port 16 and the seat surface 77 of the valve body 7 closes the downstream valve port 25.

The connector 35 is molded with an outer skin of the coil 32, and is provided so as to be positioned on a side of the yoke 31. The connector 35 is provided to energize the coil 32, and the internal terminal 35a is electrically connected to the coil 32. The electromagnetic solenoid unit 3 can control a current that energizes the coil 32 by electrically connecting the terminal 35a to a current control device or the like through the connector 35.

In a state in which the coil 32 of the electromagnetic solenoid unit 3 is not energized, the shaft 4 is urged in a direction away from the valve body 7 by the spring force of the spring 45, and the valve body 7 is pushed toward the downstream valve port 25 by the spring 70, so that the valve body 7 closes the downstream valve port 25. Further, the valve portion 42 of the shaft 4 opens the discharge valve port 16. In that state, a communication between the upstream passage 51 and the downstream passage 53 is cut off, and the oil from the downstream passage 53 passes through the outflow port 12 and the internal discharge passage 14, and is discharged to the outside from the external discharge passage 15.

When the coil 32 is energized in that state, a magnetic flux is generated in a magnetic circuit formed by the yoke 31 and the mover 33, and the mover 33 is attracted in the axial direction X toward the tip side of the housing 2, and moves toward the tip side against the urging force of the spring 45 to move the shaft 4. At that time, the valve portion 42 closes the discharge valve port 16, and the valve body 7 is pushed to the upstream side by the shaft 4, so that the valve portion 42 moves to the tip side and opens the downstream valve port 25. In that state, a communication between the upstream passage 51 and the downstream passage 53 is permitted, and the oil from the upstream passage 51 flows to the downstream passage 53 through the inlet passage 11, the valve chamber 22, the downstream valve port 25, and the outflow port 12. In that manner, a control fluid pressure of the oil outflow passage can be controlled in on/off by turning on/off the current flowing through the coil 32. This makes it possible to control a pressure, a flow rate, and the like of the control fluid used for controlling a control target.

In the electromagnetic valve 1, even at the closed position in which the valve body 7 closes the downstream valve port 25, the inner chamber of the valve body 7 and the downstream valve port 25 communicate with each other by the pressure release passage 13. As a result, even at the closed position, the pressure in the inner chamber of the valve body 7 can be released to the downstream passage 53 through the pressure release passage 13 and the downstream valve port 25. When the high supply pressure of the working fluid acts on the valve chamber 22 through the inlet passage 11, the pressure is separated between the inside and outside of the valve body 7 through the sliding portion with the support member 6, and the pressure in the inner chamber of the valve body 7 can be kept high. As a result, the valve body 7 properly functions as a switchable valve for an output pressure by opening and closing the downstream valve port 25.

At that time, since the pressure in the inner chamber of the valve body 7 can be released to the outside through the pressure release passage 13, the force for pushing the bottom portion 71 of the valve body 7 in the axial direction X can be reduced. Therefore, the pressure for pushing the valve body 7 toward the downstream valve port 25 can be reduced. Since the force for pushing the valve body 7 toward the downstream valve port 25 can be reduced, the force required for driving the shaft 4 by the electromagnetic solenoid unit 3 can be reduced. Since the driving force of the valve body by the electromagnetic solenoid unit 3 can be reduced, a passage cross-sectional area of the passage through which the working fluid such as the inlet passage 11 and the valve chamber 22 flows can be prevented from being reduced in design, and the flow rate characteristic can be ensured without increasing a size of the electromagnetic valve 1, As described above, according to the electromagnetic valve 1, the deterioration of the flow rate characteristic can be reduced, and a required valve body driving force can be reduced to reduce a size of the device. In addition, according to the electromagnetic valve 1, not only an increase in the size of the device can be avoided, but also a current value necessary for the valve driving can be reduced, so that the energy consumption can be saved. According to the electromagnetic valve 1, a desired valve function can be obtained by a simple valve configuration as compared with the case of employing a spool valve.

Figure 3:
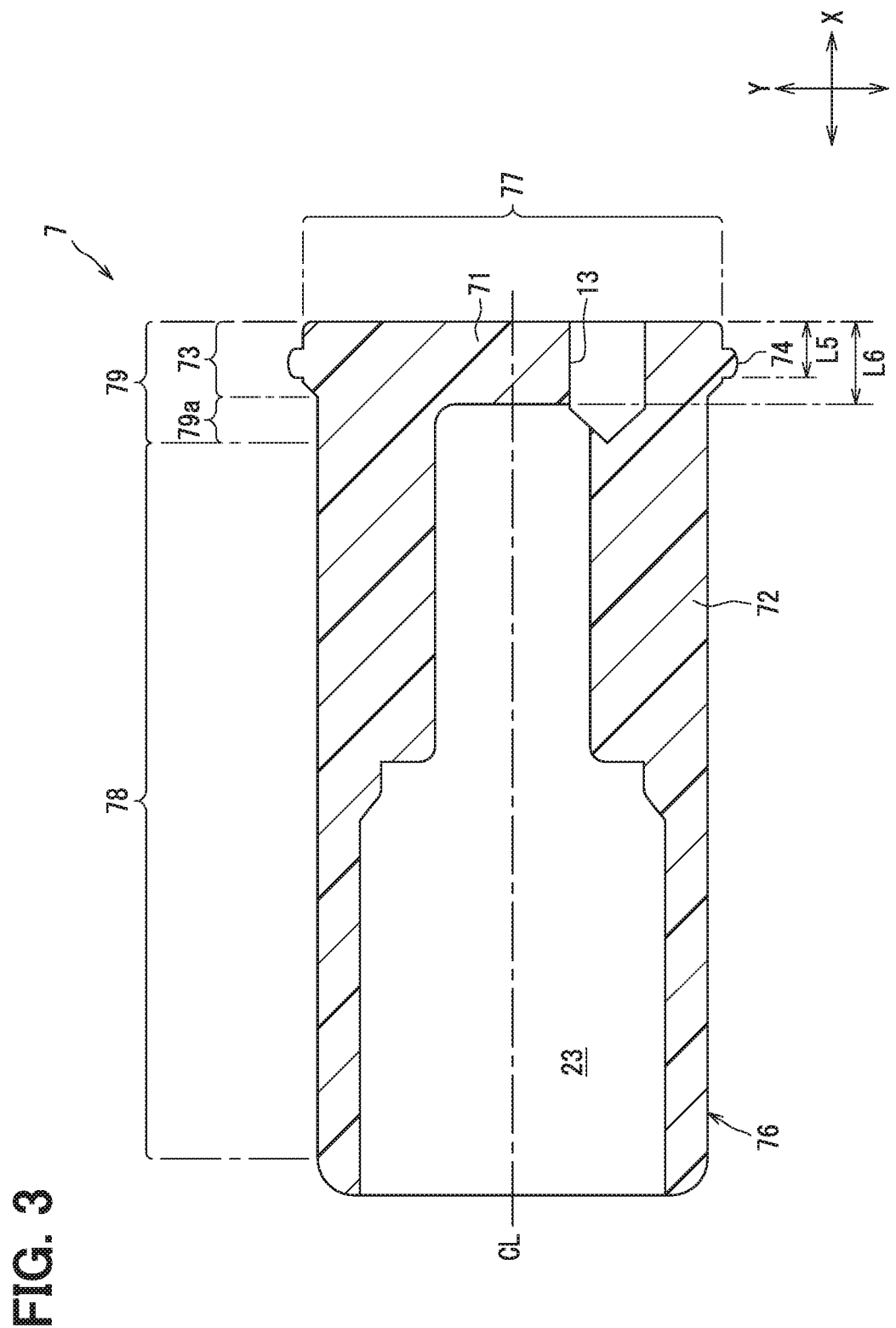
FIG. 3 is a vertical cross-sectional view of the valve body in an axial direction.

As shown in FIG. 3, in addition to the sliding surface 78, the outer wall surface of the tubular wall portion 72 of the valve body 7 includes a connection surface 79 that connects the sliding surface 78 and the seat surface 77. The connection surface 79 extends over the seat surface 77 and the sliding surface 78 in the axial direction X. The connection surface 79 is not accommodated in the support portion 61 and is exposed from the support portion 61 regardless of whether the valve body 7 is at the open position or the closed position. The sliding surface 78 and the connection surface 79 extend annularly in the circumferential direction of the valve body 7 around the center line CL. The circumferential direction of the valve body 7 is perpendicular to both of the axial direction X and the radial direction Y. In the present embodiment, the outer peripheral surface and the end face of the valve body 7 are included in the outer surface 76, the inner peripheral surface of the valve body 7 is included in the inner surface, and the outer surface 76 and the inner surface are included in the surface of the valve body 7. The outer peripheral surface of the valve body 7 has the sliding surface 78 and the connection surface 79, and is formed by the outer wall surface of the tubular wall portion 72. The outer surface 76 of the valve body 7 has the seat surface 77, the sliding surface 78, and the connection surface 79.

Figure 4:
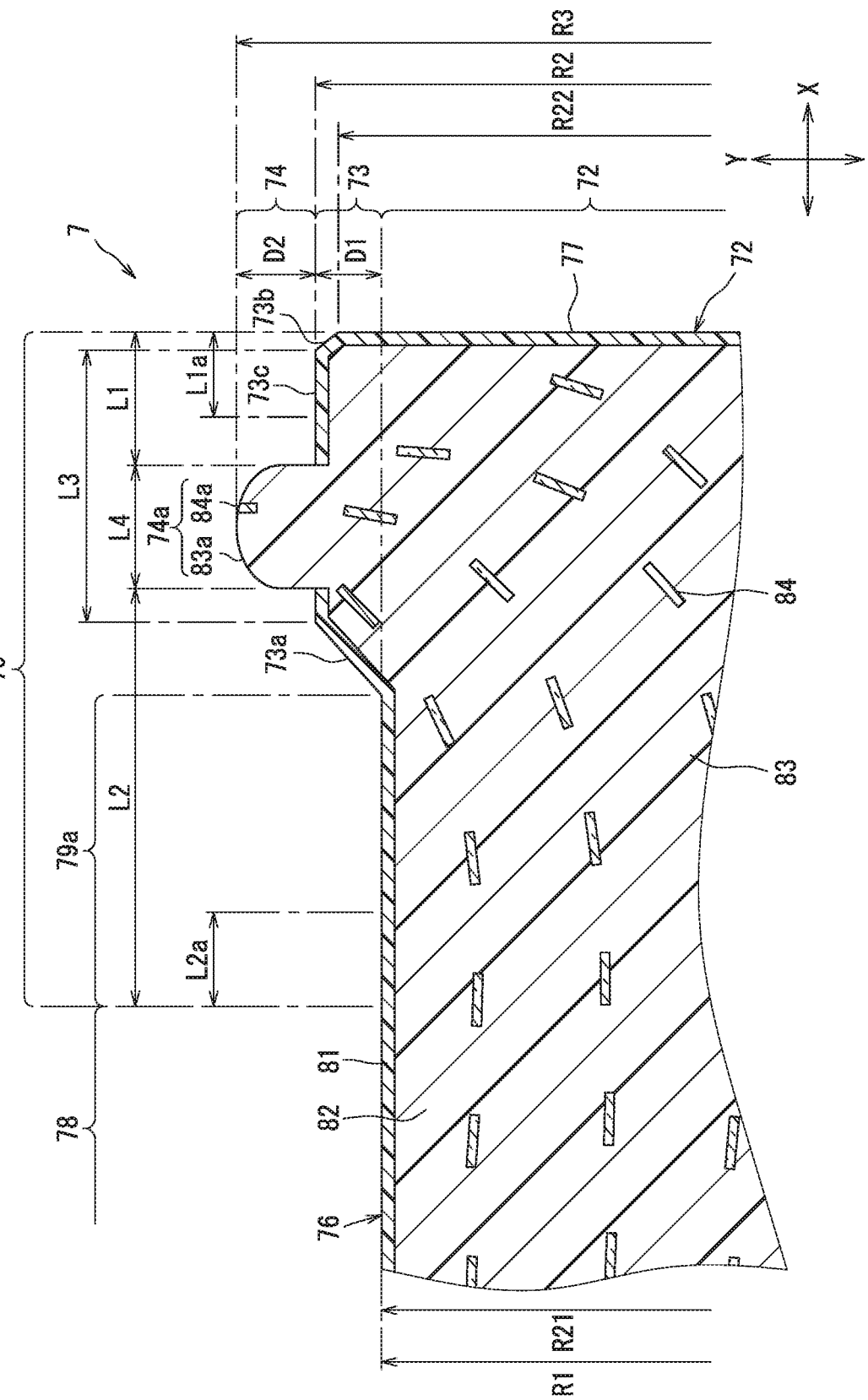
FIG. 4 is an enlarged view of the periphery of a gate remaining portion of a gate in FIG. 3.
Figure 5:
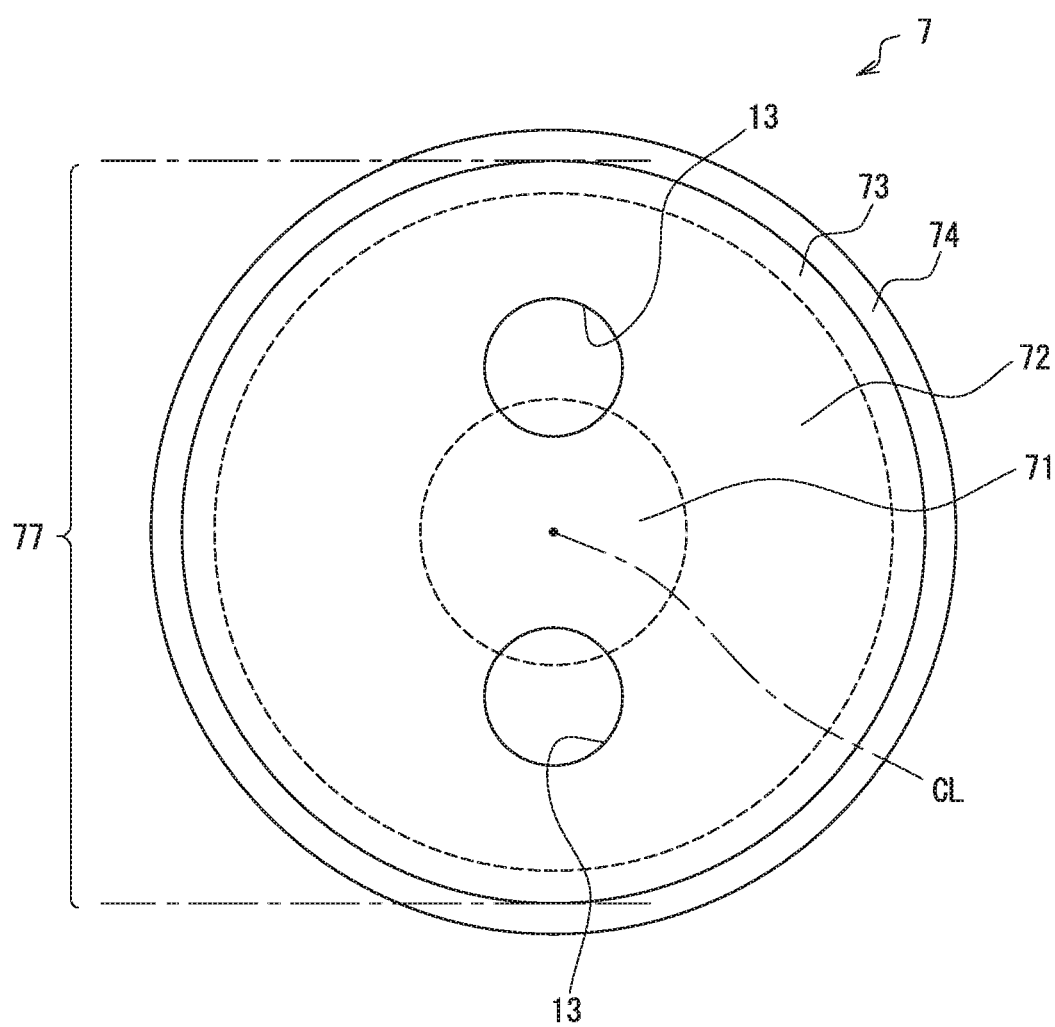
FIG. 5 is a view of the valve body when viewed from a seat surface side.

As shown in FIGS. 3 to 5, the valve body 7 has a connection protruding portion 73 formed by the connection surface 79 protruding toward the radially outer side. The connection protruding portion 73 is provided at the downstream end portion of the connection surface 79, and is spaced downstream from the support portion 61 in the axial direction X even when the valve body 7 is at either the open position or the closed position. In the connection surface 79, a portion where the connection protruding portion 73 is not provided is a flat surface 79a extending in the axial direction X. The connection protruding portion 73 and the flat surface 79a extend along the connection surface 79 in an annular shape in the circumferential direction of the valve body 7. The connection protruding portion 73 protrudes toward the radially outer side from either the sliding surface 78 or the flat surface 79a.

In the connection protruding portion 73, the upstream corner portion and the downstream corner portion are chamfered by chamfered surfaces 73a and 73b, and a tip end face 73c of the connection protruding portion 73 is extended across the chamfered surfaces 73a and 73b in a state of extending in the axial direction X. The chamfered surfaces 73a and 73b and the tip end face 73c extend annularly in the circumferential direction of the valve body 7, and are included in the connection surface 79. A diameter R2 of the tip end face 73c is larger than a diameter R1 of the flat surface 79a. A diameter R21 of the upstream end portion of the upstream chamfered surface 73a is the same as the diameter R1 of the flat surface 79a. A diameter R22 of the downstream end portion of the downstream chamfered surface 73b is larger than the diameter R1 of the flat surface 79a and smaller than the diameter R2 of the tip end face 73c. The diameter R22 is a diameter of the seat surface 77. The chamfered surfaces 73a and 73b are inclined surfaces extending straight in a direction inclined with respect to the radial direction Y.

In the valve body 7, the downstream end face of the connection protruding portion 73 and the downstream end face of the tubular wall portion 72 form the seat surface 77, and the seat surface 77 is perpendicular to the axial direction X. At least a part of the seat surface 77 does not have to be orthogonal to the axial direction X. Further, the seat surface 77 may be larger toward the radially outer side than the valve seat 24. In FIG. 5, the downstream chamfered surface 73b and the like are not shown.

In the valve chamber 22, a fluid pressure acting toward the downstream side is applied to the upstream chamfered surface 73a of the connection protruding portion 73 from the working fluid that has entered between the support portion 61 and the connection protruding portion 73. The fluid pressure causes the seat surface 77 of the valve body 7 to press against the valve seat 24, thereby enhancing a shutting function of keeping the valve body 7 at the closed position. The connection protruding portion 73 corresponds to an annular protruding portion.

Since the chamfered surfaces 73a and 73b are provided on the connection protruding portion 73, the upstream corner portion and the downstream corner portion of the connection protruding portion 73 are less likely to be unintentionally chipped or deformed when the valve body 7 is molded with resin. In the above configuration, when the valve body 7 is at the closed position, the working fluid that has entered between the downstream chamfered surface 73b and the valve seat 24 pushes the downstream chamfered surface 73b in the direction in which the seat surface 77 is separated from the valve seat 24. Further, since the upstream chamfered surface 73a is inclined with respect to the radial direction Y, a force by which the working fluid presses the seat surface 77 against the valve seat 24 is reduced by the chamfered surface 73a. As described above, the chamfered surfaces 73a and 73b reduce the force required to move the valve body 7 away from the valve seat 24 by the driving of the electromagnetic solenoid unit 3, so that the shutting function of keeping the valve body 7 at the closed position is inhibited from being excessively high by the connection protruding portion 73.

As shown in FIG. 4, the valve body 7, which is a resin molded product, has a skin layer 81 forming the surface of the valve body 7, and a core layer 82 provided inside the skin layer 81. The skin layer 81 forms the seat surface 77, the sliding surface 78 and the connection surface 79. The valve body 7 has a resin portion 83 made of a resin material, and glass fibers 84 which are fillers mixed in the resin portion 83. In both the skin layer 81 and the core layer 82, the glass fibers 84 are mixed in the resin portion 83. A filler of a type different from that of the glass fibers 84 may be mixed in the resin portion 83.

As shown in FIGS. 3 to 5, the valve body 7 has a gate remaining portion 74, which is a trace of cutting the gate portion 101 (refer to FIG. 7) at the time of manufacturing the valve body 7. The gate remaining portion 74 is a part of the gate portion 101 remaining on the valve body 7 as the gate portion 101 is cut, and is a projection portion formed by the connection surface 79 projecting toward the radially outer side. The gate remaining portion 74 extends radially outward from the connection protruding portion 73, and protrudes toward the radially outer side from the sliding surface 78 and the seat surface 77. The gate remaining portion 74 is also a projection portion formed by projecting the tip end face 73c of the connection protruding portion 73 toward the radially outer side, and protrudes to the radially outer side from the downstream end portion of the upstream chamfered surface 73a.

In the gate remaining portion 74, the core layer 82 is exposed in the valve chamber 22, and a portion of the outer surface of the gate remaining portion 74 formed by the core layer 82 is referred to as a core exposed portion 74a. The gate remaining portion 74 and the core exposed portion 74a extend annularly in the circumferential direction of the valve body 7 along the connection protruding portion 73, and are disposed at positions aligned with the bottom portion 71 in the radial direction Y. The skin layer 81 does not form or only partially forms the outer surface of the gate remaining portion 74, and the entire or a part of the outer surface of the gate remaining portion 74 is the core exposed portion 74a. In either case, the core exposed portion 74a is included in the connection surface 79. The whole of the seat surface 77, the whole of the sliding surface 78, and most of the connection surface 79 are formed by the skin layer 81, and the core exposed portion 74a which is a part of the connection surface 79 is formed by the core layer 82. FIG. 4 shows a configuration in which the entire outer surface of the gate remaining portion 74 is the core exposed portion 74a.

The core exposed portion 74a is a cut surface of the skin layer 81 and the core layer 82, and is a cut surface of the valve body 7. The core exposed portion 74a includes a cut surface obtained by cutting the resin portion 83 and a cut surface obtained by cutting the glass fibers 84, and those cut surfaces are exposed in the core exposed portion 74a. A surface of the outer surface 76 of the valve body 7 formed by the skin layer 81 is a molding surface molded by a mold device 90, which will be described later. The surface may be neither a cut surface of the skin layer 81 or the core layer 82, nor a cut surface of the resin portion 83 or the glass fibers 84.

The gate remaining portion 74 is provided at a position separated from both of the seat surface 77 and the sliding surface 78 in the axial direction X. As shown in FIG. 4, a separation distance L1 between the seat surface 77 and the gate remaining portion 74 in the axial direction X is equal to or larger than a predetermined distance L1a, A separation distance L2 between the sliding surface 78 and the gate remaining portion 74 in the axial direction X is equal to or larger than a predetermined distance L2a. The predetermined distances L1a and L2a are set to, for example, a value equal to or larger than a length dimension L4 of the gate remaining portion 74 in the axial direction X (for example, 0.2 mm). In that case, the gate remaining portion 74 and the core exposed portion 74a are disposed at positions separated from the seat surface 77 by at least a predetermined distance L1a in the axial direction X and separated from the sliding surface 78 by at least a predetermined distance L2a.

In the axial direction X, a length dimension L3 of the tip end face 73c of the connection protruding portion 73 is larger than a length dimension L4 of the gate remaining portion 74. The length dimension L3 is, for example, 0.6 to 0.7 mm, and the length dimension L4 is, for example, 0.2 to 0.3 mm. The gate remaining portion 74 is disposed at a position separated from both of the upstream chamfered surface 73a and the downstream chamfered surface 73b in the tip end face 73c. As shown in FIG. 3, in the axial direction X, a separation distance L5 between the upstream end portion of the gate remaining portion 74 and the seat surface 77 is smaller than a thickness dimension L6 of the bottom portion 71. This realizes a configuration in which the gate remaining portion 74 and the bottom portion 71 are aligned in the radial direction Y.

As shown in FIG. 4, a diameter R3 of the tip portion of the gate remaining portion 74 is larger than a diameter R2 of the tip end face 73c. In the radial direction Y, a protrusion dimension D2 of the gate remaining portion 74 from the tip end face 73c of the connection protruding portion 73 is larger than a protrusion dimension D1 of the connection protruding portion 73 from the flat surface 79a. The protrusion dimension D2 is 0.2 mm, for example, and the protrusion dimension D1 is 0.15 mm, for example.

In the connection surface 79, a virtual region extending from the seat surface 77 toward the sliding surface 78 by the predetermined distance L1a and a virtual region extending from the sliding surface 78 toward the seat surface 77 by the predetermined distance L2a configure a gate installation prohibition range in which the installation of the gate portion 101 is prohibited.

Next, a method of manufacturing the electromagnetic valve 1 will be described. The method of manufacturing the electromagnetic valve 1 includes a method of manufacturing the valve body 7 using a mold device 90 such as a mold. The method of manufacturing the electromagnetic valve 1 corresponds to a method of manufacturing the control valve.

Figure 6:
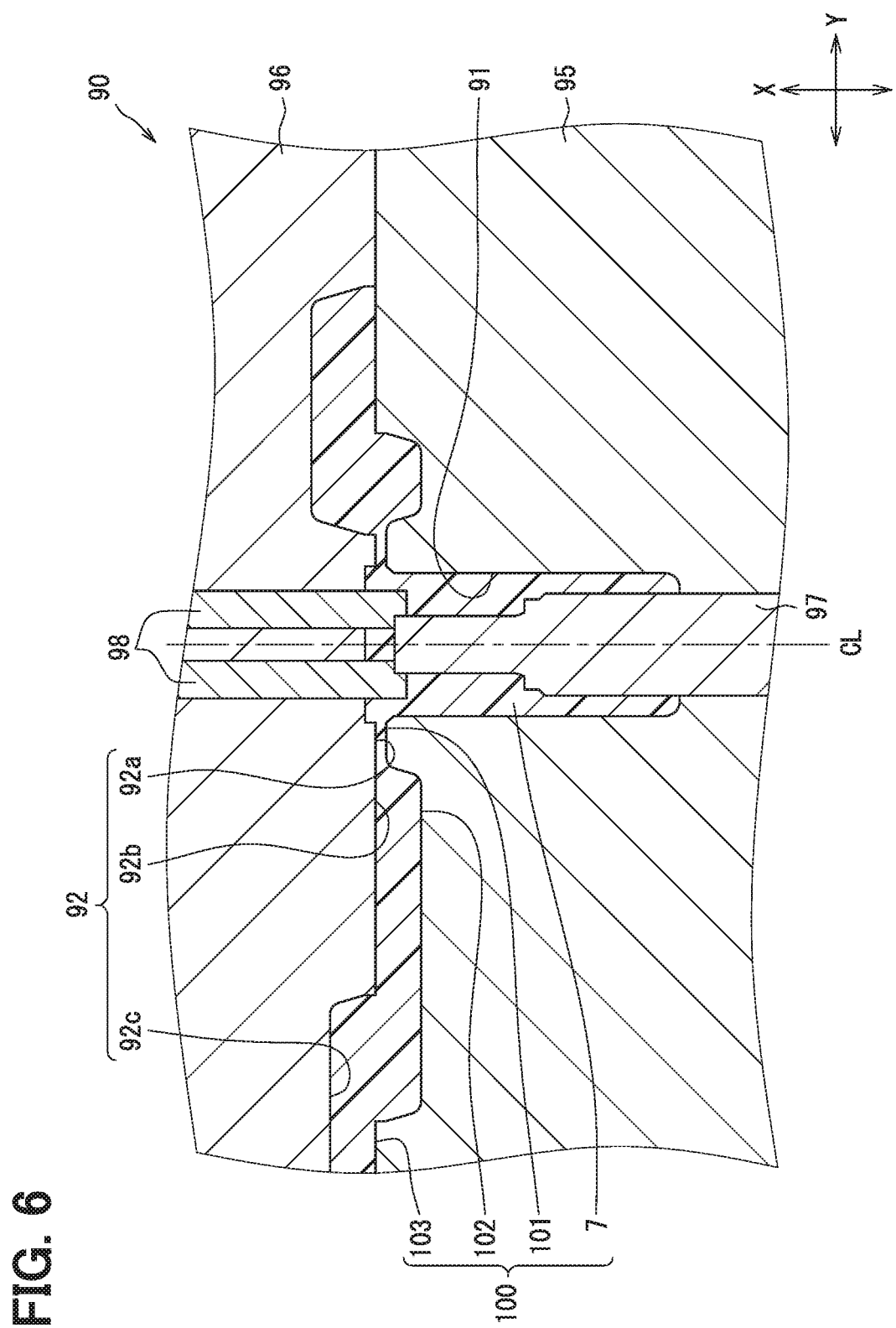
FIG. 6 is a vertical cross-sectional view showing a configuration of a mold device.

First, the mold device 90 for molding the valve body 7 with resin will be described. As shown in FIG. 6, a cavity 91 for molding the valve body 7 and a resin passage 92 for supplying a molten resin to the cavity 91 are provided inside the mold device 90. Since the cavity 91 has a circular tubular internal space, the tubular valve body 7 is molded by the cavity 91. In addition, only one connection portion where the resin passage 92 and the cavity 91 are connected to each other is provided.

The resin passage 92 includes a sprue (not shown) to which the molten resin is supplied from an injection molding machine, a gate 92a for supplying the molten resin to the cavity 91, and runners 92b and 92c for connecting the sprue and the gate 92a. The gate 92a is a film gate, and is provided on an outer peripheral side of the cavity 91, and extends annularly along a circumferential direction of the cavity 91. The gate 92a is disposed in the radial direction Y at a position aligned with a portion of the cavity 91 where the tubular end portion 2a is molded. The first runner 92b is provided on an outer peripheral side of the gate 92a, and extends in an annular shape along a circumferential direction of the gate 92a. The second runner 92c connects the first runner 92b with the sprue while extending in the radial direction Y.

The mold device 90 has mold portions 95 to 98. In the mold device 90, the mold portions 95 to 98 are combined with each other to form the cavity 91, the gate 92a, and the runners 92b and 92c. With respect to the valve body 7, the first mold portion 95 is molded with at least the sliding surface 78, and the second mold portion 96 is molded with at least the seat surface 77. The first pin mold portion 97 is inserted into an insertion hole provided in the first mold portion 95 to be assembled to the first mold portion 95, and the inner peripheral surface of the spring chamber 23 is molded. The second pin mold portion 98 is inserted into an insertion hole provided in the second mold portion 96 to be assembled to the second mold portion 96, and the inner peripheral surface of the pressure release passage 13 is molded.

In the case of manufacturing the valve body 7, after preparing the mold device 90, a step of molding a molded body 100 with the use of the mold device 90 is performed. In that step, first, a molten resin, which is a resin material in which the glass fibers 84 are mixed, is injected from an injection molding machine into the sprue of the mold device 90. The molten resin flows from the gate 92a into the cavity 91 through the runners 92b and 92c, proceeds in the radial direction Y to reach a portion of the cavity 91 where the bottom portion 71 is molded, and advances in the axial direction X to reach a portion of the cavity 91 where the tubular wall portion 72 is molded.

Since the gate 92a and the portion of the cavity 91 where the bottom portion 71 is molded are aligned in the radial direction Y, a flow direction of the molten resin in the portion of the cavity 91 where the bottom portion 71 is molded is easily made uniform in the radial direction Y. In that case, the flow of the molten resin is hardly disturbed in the portion of the cavity 91 where the seat surface 77 is molded. For that reason, when the molten resin solidifies to form the bottom portion 71 and the seat surface 77, the shrinkage anisotropy of the molten resin is reduced, so that the bottom portion 71 and the seat surface 77 are less likely to be bent or deformed.

As described above, since the gate 92a has the annular shape, the molten resin flowing through the portion of the cavity 91 where the tubular wall portion 72 is molded does not easily advance in the circumferential direction of the cavity 91 and easily advances in the axial direction X. In other words, a flow of the molten resin in the portion of the cavity 91 where the sliding surface 78 is molded is hardly disturbed. For that reason, when the molten resin solidifies to form the tubular wall portion 72, a shrinkage anisotropy of the molten resin is reduced, so that the tubular wall portion 72 and the sliding surface 78 are less likely to be bent or deformed.

In addition, since the gate 92a has the annular shape, the molten resin flowing in the opposite direction in the circumferential direction of the cavity 91 is less likely to be merged with each other. For that reason, a weld, which is the merging portion of the molten resin, hardly occurs when the molten resin is solidified and the tubular wall portion 72 is molded. When the molten resin is injected into the mold device 90, the inside of the cavity 91 is degassed by the first pin mold portion 97 so that the gas escapes from a side opposite to the gate 92a in the axial direction X of the cavity 91.

After the molten resin has been solidified, the mold device 90 is removed from the molded body 100 which is the solidified molten resin. In the molded body 100, a portion of the molten resin injected into the mold device 90, which comes in contact with the inner peripheral surfaces of the cavity 91, the gate 92a, and the runners 92b and 92c cools and solidifies, thereby forming the skin layer 81. After the skin layer 81 has been formed, the molten resin flowing inside the skin layer 81 solidifies at a timing later than that of the skin layer 81, thereby forming the core layer 82.

Figure 7:
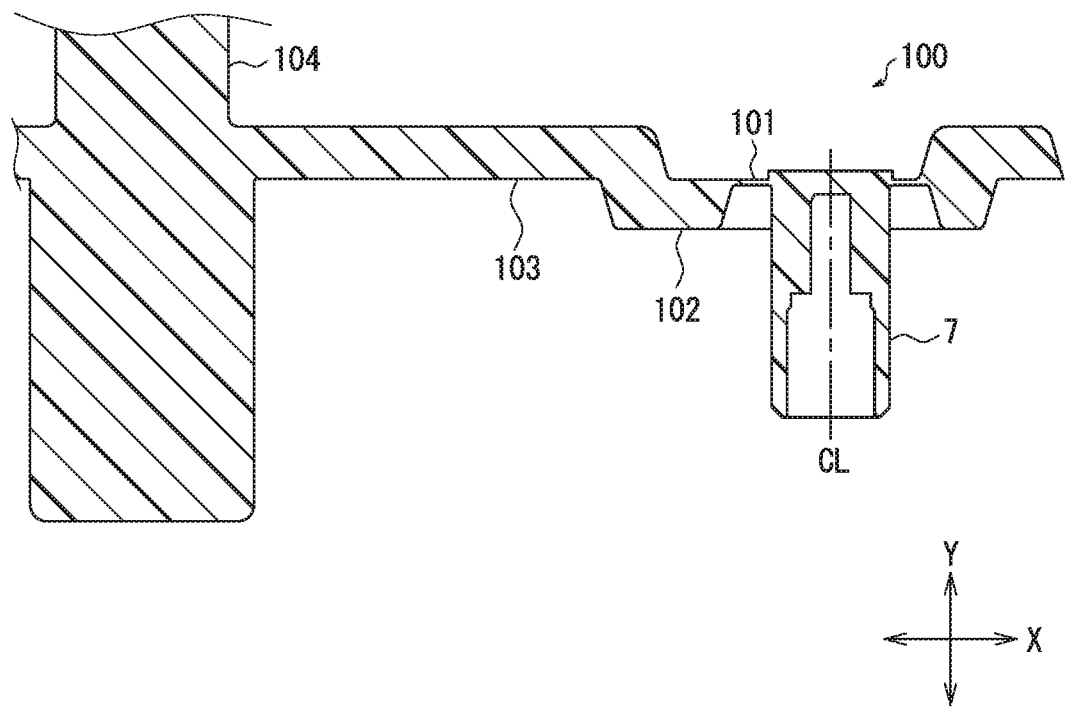
FIG. 7 is a vertical cross-sectional view showing a molded body.
Figure 8:
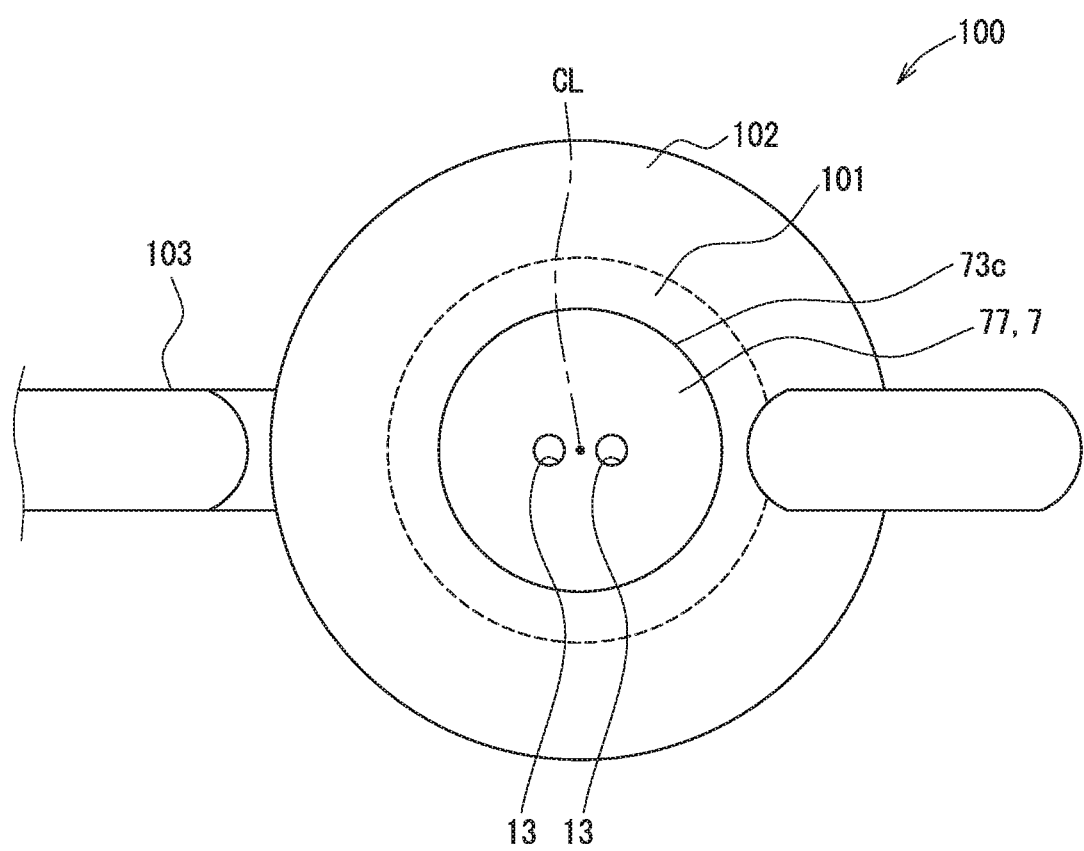
FIG. 8 is a view of a periphery of the valve body in the molded body when viewed from the seat surface side.

As shown in FIG. 7, in the molded body 100, the valve body 7, the gate portion 101 molded by the gate 92a, the runner portions 102 and 103 molded by the runners 92b and 92c, and the sprue portion 104 molded by the sprue are integrated together. As shown in FIG. 8, the gate portion 101 extends toward the radially outer side from the tip end face 73c of the valve body 7, and annularly extends in the circumferential direction of the valve body 7. The first runner portion 102 extends toward the radially outer side from the gate portion 101, and annularly extends in the circumferential direction of the gate portion 101. In that case, the gate portion 101 is disposed between the valve body 7 and the first runner portion 102 in the radial direction Y of the valve body 7, and is disposed at a position separated from each of the seat surface 77 and the sliding surface 78 in the axial direction X of the valve body 7. The second runner portion 103 connects the first runner portion 102 and the sprue portion 104.

Figure 9:
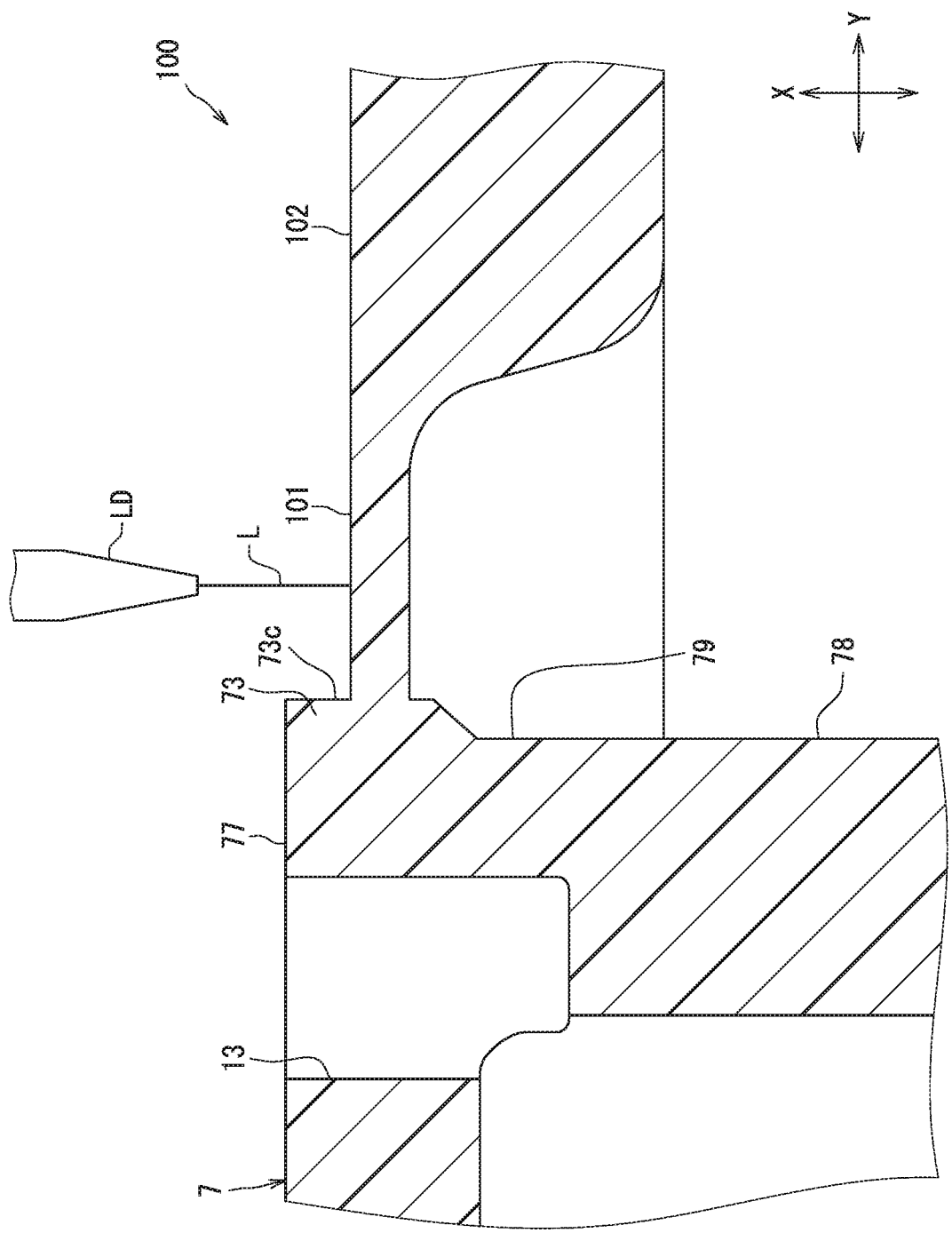
FIG. 9 is a diagram illustrating cutting of a gate portion by a laser.

Next, a step of removing the valve body 7 from the first runner portion 102 in the molded body 100 is performed. Since the valve body 7 is included in the molded body 100 having the skin layer 81 and the core layer 82, the valve body 7 also has the skin layer 81 and the core layer 82, In that step, as shown in FIG. 9, the gate portion 101 is cut by a laser L output from a laser irradiation device LD, In this example, the laser L is output from the laser irradiation device LD so that the laser L extends in the axial direction X of the valve body 7, and a position spaced radially outward from the connection protruding portion 73 of the valve body 7 and radially inward from the first runner portion 102 in the gate portion 101 is irradiated with the laser L. After the gate portion 101 has been cut off, a portion of the gate portion 101 remaining on the valve body 7 becomes the gate remaining portion 74.

When the gate portion 101 is cut by the laser L, it is assumed that a part of the gate portion 101 is melted by a heat of the laser L, and the melted resin spreads in the axial direction X. On the other hand, in the molded body 100, the gate portion 101 is separated from the seat surface 77 by at least a predetermined distance L1a and separated from the sliding surface 78 by at least a predetermined distance L2a, similarly to the gate remaining portion 74 described above. For that reason, even if a part of the gate portion 101 melts and spreads in the axial direction X in accordance with the irradiation with the laser L, the melted resin is less likely to reach the seat surface 77 and the sliding surface 78. In other words, the predetermined distances L1a and L2a indicating the lower limit values of the separation distances L1 and L2 of the gate remaining portion 74 from the seat surface 77 and the sliding surface 78 are set to values such that the melted portion of the gate portion 101 hardly reaches the seat surface 77 and the sliding surface 78. In addition, since a part of the gate portion 101 melts and expands in the axial direction X, the length dimension L4 of the gate remaining portion 74 in the axial direction X tends to be larger than a thickness dimension of the gate portion 101 in the axial direction X.

In the gate portion 101, both of the skin layer 81 and the core layer 82 are melted in accordance with the irradiation with the laser L, so that the skin layer 81 is easily disappeared in the gate remaining portion 74. In the gate remaining portion 74, both of the portion where the core layer 82 has been cut and the portion where the skin layer 81 has disappeared are collectively referred to as a core exposed portion 74a, and the core exposed portion 74a is a cut surface of the valve body 7 in the molded body 100. For that reason, as shown in FIG. 4, in the gate remaining portion 74, the core layer 82 is easily exposed not only to the radially outer side of the valve body 7 but also to the axial direction X. The core exposed portion 74a is a trace obtained by cutting the gate portion 101, and corresponds to a gate trace.

When the gate portion 101 is cut by the laser L, both the resin portion 83 and the glass fibers 84 are cut by the laser L, and the core exposed portion 74a includes a cut surface 83a of the resin portion 83 and a cut surface 84a of the glass fiber 84. The glass fibers 84 cut by the laser L may fall off from the resin portion 83 due to shortening or the like. In that case, a hole is provided in the core exposed portion 74a by the glass fiber 84 falling off.

Subsequently, an assembling step is performed in which multiple members such as the housing 2, the support member 6, the valve body 7, and the electromagnetic solenoid unit 3 are assembled to each other. The assembling step includes a step of installing the valve body 7 in the valve chamber 22 of the housing 2. In that step, the valve body 7 is assembled to the support member 6 by inserting the sliding surface 78 of the valve body 7 so as to accommodate the spring 70 into the internal space of the support portion 61. Then, the valve body 7 and the support member 6 are inserted into the valve chamber 22 through the opening on the tip side of the housing 2. As a result, the valve body 7 is installed in the valve chamber 22 so that only the sliding surface 78 of the sliding surface 78 and the connection surface 79 can slide on the inner wall surface 61a of the support portion 61. In this example, the mounting portion 60 of the support member 6 is fixed to the housing 2.

The assembling step includes a step of attaching the electromagnetic solenoid unit 3 to the housing 2 so as to move the valve body 7 in the axial direction X to shift to the open position and the closed position. In that step, the tip portion 41 of the shaft 4 is inserted inside the shaft holding portion 26 so as to accommodate the spring 45 inside the shaft holding portion 26 of the housing 2, and the mover 33 is fixed to the large diameter portion 44 of the shaft 4. The yoke 31, the coil 32, the bobbin 34, and the connector 35 are attached to the housing 2 and the mover 33.

According to the present embodiment described so far, the core exposed portion 74a is provided on the connection surface 79 of the valve body 7, but is not provided on the seat surface 77 and the sliding surface 78. For that reason, when the seat surface 77 closes the downstream valve port 25 because the valve body 7 is at the closed position, the sealing property of the downstream valve port 25 by the seat surface 77 can be inhibited from being lowered by the core exposed portion 74a. Further, when the sliding surface 78 of the valve body 7 slides with respect to the inner wall surface 61a of the support portion 61, the deterioration of the sliding property of the valve body 7 due to the core exposed portion 74a can be reduced.

As described above, the core exposed portion 74a is not provided on the seat surface 77 and the sliding surface 78. For that reason, there is no need to perform an additional work after molding in which the outer surface 76 of the valve body 7 is subjected to a finishing work or the like to make the core exposed portion 74a as smooth as the seat surface 77 and the sliding surface 78, and the cost can be reduced by the amount by which the additional work is not performed. In addition, there is no need to perform the gate processing for cutting the gate portion 101 so that burrs such as the gate remaining portion 74 do not remain in the valve body 7.

As described above, the sealing property and the sliding property of the valve body 7 can be enhanced while reducing the number of working steps in manufacturing the valve body 7.

According to the present embodiment, in the valve body 7, the core exposed portion 74a extends annularly around the center line CL, In the above configuration, when the valve body 7 is molded with resin using the mold device 90, the flow of the molten resin is less likely to be disturbed and the uneven shrinkage of the molten resin is less likely to be caused in the portion where the tubular wall portion 72 is molded in the cavity 91. For that reason, unintentional deformation or distortion does not easily occur in the tubular wall portion 72, and the sliding surface 78 can be inhibited from being distorted in the radial direction Y to deteriorate the slidability of the valve body 7. Further, in the above configuration, since the weld is hardly generated in the valve body 7 at the time of resin molding of the valve body 7, the strength of the valve body 7 can be inhibited from being lowered by the weld.

According to the present embodiment, the valve body 7 has the gate remaining portion 74 in which a part of the connection surface 79 protrudes toward the radially outer side from the sliding surface 78, and the core exposed portion 74a is included in the outer surface of the gate remaining portion 74. In the above configuration, when the gate portion 101 is cut in the molded body 100 at the time of manufacturing the valve body 7, a portion separated from the tubular wall portion 72 of the valve body 7 in the gate portion 101 may be cut. This makes it possible to prevent the tubular wall portion 72 of the valve body 7 from being hurt or damaged when the gate portion 101 is cut. In particular, the connection protruding portion 73, which is the connection destination of the gate portion 101, can be prevented from being deformed or melted by the heat of the laser L.

According to the present embodiment, the valve body 7 has a connection protruding portion 73 in which a portion of the connection surface 79 closer to the seat surface 77 and extending annularly around the center line CL protrudes toward the radially outer side from the sliding surface 78. In the above configuration, the working fluid present in the valve chamber 22 on the upstream side of the connection protruding portion 73 presses the connection protruding portion 73 toward the downstream side, so that the seat surface 77 of the valve body 7 is pressed against the valve seat 24 of the housing 2. For that reason, the state in which the valve body 7 closes the downstream valve port 25 can be reliably maintained by leveraging the fluid pressure applied to the connection protruding portion 73.

In addition, the gate remaining portion 74 extends toward the radially outer side from the connection protruding portion 73. In the above configuration, the seating surface 77 of the valve body 7 is pressed against the valve seat 24 of the housing 2 by the fluid pressure applied to the connection protruding portion 73 as well as the fluid pressure applied to the gate remaining portion 74. For that reason, the state in which the valve body 7 closes the downstream valve port 25 can be more reliably maintained by leveraging the fluid pressure applied to the connection protruding portion 73 and the gate remaining portion 74.

According to the present embodiment, the core exposed portion 74a and the bottom portion 71 are aligned in the radial direction Y. In the above configuration, when the valve body 7 is molded with resin by using the mold device 90, the flow of the molten resin is hardly disturbed and the uneven shrinkage of the molten resin is hardly caused in the portion where the bottom portion 71 and the seat surface 77 are molded in the cavity 91. For that reason, unintentional deformation or distortion is less likely to occur in the bottom portion 71 or the seat surface 77, and the seat surface 77 can be prevented from being distorted in the axial direction X to deteriorate the sealing property of the valve body 7.

According to the present embodiment, the core exposed portion 74a is provided at a position separated from each of the seat surface 77 and the sliding surface 78 in the axial direction X. For that reason, even if the position of the core exposed portion 74a is deviated in the axial direction X at the time of manufacturing the valve body 7, the inclusion of the core exposed portion 74a in the seat surface 77 and the sliding surface 78 can be prevented. The case where the position of the core exposed portion 74a deviates in the axial direction X includes a case where a part of the gate portion 101 is melted by a heat applied along with the cutting and reaches the seat surface 77 and the sliding surface 78 when the gate portion 101 is cut at the time of manufacturing the valve body 7. As described above, even if the shape, size, and position of the core exposed portion 74a are changed with respect to the gate portion 101 in accordance with the cutting of the gate portion 101, the core exposed portion 74a is hardly included in the seat surface 77 and the sliding surface 78.

According to the present embodiment, in the core exposed portion 74a, the cut surface of the glass fibers 84 mixed in the resin portion 83 of the valve body 7 is exposed. Similarly, in the above configuration, since the cut surface of the glass fibers 84 is included in the connection surface 79 of the valve body 7, the sealing property and the sliding property of the valve body 7 can be prevented from being deteriorated due to the cut surface of the glass fibers 84.

According to the present embodiment, the gate portion 101 of the molded body 100 is cut by irradiation with the laser L. This makes it possible to easily cut the gate portion 101 in accordance with the shape of the gate portion 101. For example, in a configuration in which the gate portion 101 extends annularly in the circumferential direction of the valve body 7, cutting can be facilitated so that the cut surface extends annularly along the circumferential direction of the valve body 7.

Second Embodiment

A second embodiment will be described with reference to FIG. 10, In the second embodiment, components denoted by the same reference numerals as those in the drawings according to the first embodiment and the configurations not described are the same as those in the first embodiment, and have the same operation and effects. In the second embodiment, portions different from those of the first embodiment will be described.

Figure 10:
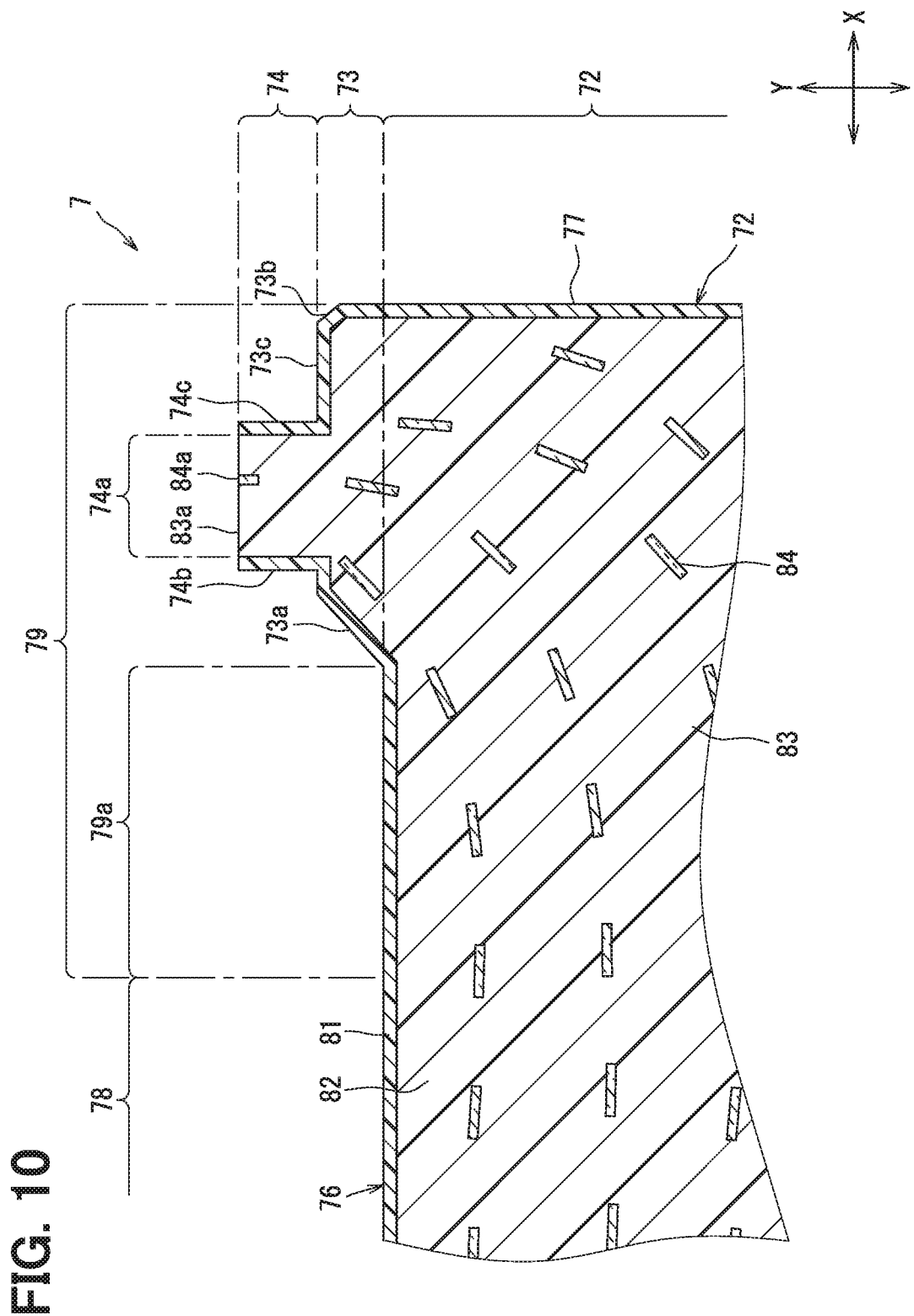
FIG. 10 is an enlarged view of a periphery of a gate remaining portion of a gate according to at least one embodiment.

As shown in FIG. 10, a gate remaining portion 74 according to the present embodiment has a pair of side surfaces 74b and 74c extending in a radial direction Y and a tip end face extending over the side surfaces 74b and 74c, and the tip end face configures a core exposed portion 74a. The pair of side surfaces 74b and 74c are formed by a skin layer 81, extend toward the radially outer side from a tip end face 73c of the connection protruding portion 73 and extend annularly in the circumferential direction of the valve body 7. In the gate remaining portion 74, the upstream side surface 74b faces the upstream side of the valve chamber 22 in the axial direction X, and the downstream side surface 74c faces the downstream side of the valve chamber 22 in the axial direction X.

In the present embodiment, a gate portion 101 is cut by a cutting tool that mechanically cuts the gate portion 101 at the time of manufacturing the valve body 7. In that case, a heat is hardly applied to the gate portion 101 at the time of cutting the gate portion 101. For that reason, the skin layer 81 disappears in the gate remaining portion 74 due to melting of a part of the gate portion 101, and the melted portion of the gate portion 101 is less likely to spread in the axial direction X. Even in the case where the cutting of the gate portion 101 is performed by a laser L as in the first embodiment, if the skin layer 81 does not disappear, the configuration in which the gate remaining portion 74 has the skin layer 81 is realized.

According to the present embodiment, the upstream side surface 74b of the gate remaining portion 74 extends in the radial direction Y. For that reason, when the working fluid present in the valve chamber 22 on the upstream side of the gate remaining portion 74 presses the upstream side surface 74b toward the downstream side, the fluid pressure applied to the upstream side surface 74b tends to hold the valve body 7 at the closed position.

Third Embodiment

A third embodiment will be described with reference to FIG. 11. In the third embodiment, components denoted by the same reference numerals as those in the drawings according to the first embodiment and the configurations not described are the same as those in the first embodiment, and have the same operation and effects. In the third embodiment, portions different from those of the first embodiment will be described.

Figure 11:
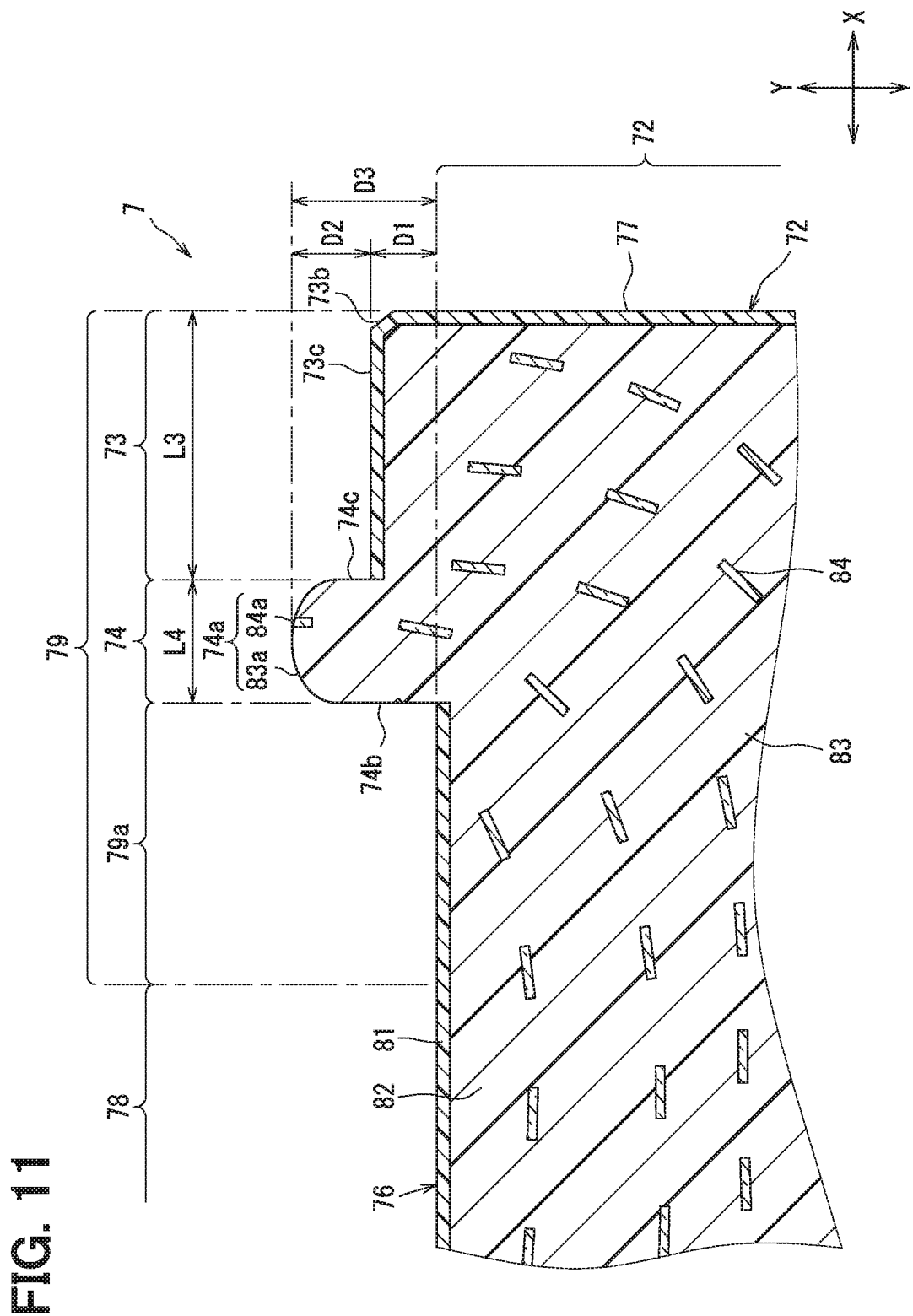
FIG. 11 is an enlarged view of a periphery of a gate remaining portion of a gate according to at least one embodiment.

As shown in FIG. 11, a gate remaining portion 74 according to the present embodiment is provided on a flat surface 79a and is provided transversely to a connection protruding portion 73 in an axial direction X. The gate remaining portion 74 and the connection protruding portion 73 are connected to each other. The gate remaining portion 74 has a pair of side surfaces 74b and 74c as in the second embodiment. The upstream side surface 74b extends toward the radially outer side from the flat surface 79a, and the downstream side surface 74c extends toward the radially outer side from the tip end face 73c of the connection protruding portion 73. The core exposed portion 74a is a tip end face extending over the pair of side surfaces 74b and 74c in the gate remaining portion 74.

A protrusion dimension D3 of the gate remaining portion 74 from the flat surface 79a is larger than a protrusion dimension D2 of the connection protruding portion 73 from the flat surface 79a. For that reason, even in the configuration in which the gate remaining portion 74 protrudes toward the radially outer side from the flat surface 79a, when the gate portion 101 is cut at the time of manufacturing the valve body 7, the connection protruding portion 73 can be prevented from being deformed or melted by the heat of the laser L.

Similar to the first embodiment, a length dimension L4 of the gate remaining portion 74 in the axial direction X is smaller than a length dimension L3 of the connection protruding portion 73. The length dimension L3 of the gate remaining portion 74 may be equal to or larger than the length dimension L3 of the connection protruding portion 73. The gate remaining portion 74 may be provided at a position separated from the connection protruding portion 73 toward the sliding surface 78.

The present disclosure is not limited to the above-described embodiments. The present disclosure includes the above-described embodiments and modification thereof by a skilled person. For example, the present disclosure is not limited to the components or the combinations of elements shown in the embodiments, and can be modified in various modifications. The present disclosure includes an additional portion which can be added to the embodiments. The present disclosure includes a component and an element omitted in the embodiments. The present disclosure includes replacement and combination of components and elements between one and another of the embodiments. The scope of the present disclosure is not limited to the descriptions of the embodiments.

As Modification 1, the core exposed portion 74a may be included in the tip end face 73c or the flat surface 79a of the connection protruding portion 73, instead of being included in the outer surface of the gate remaining portion 74. In other words, the valve body 7 may have only the core exposed portion 74a in the gate remaining portion 74 and the core exposed portion 74a. For example, in the first embodiment, the core exposed portion 74a is formed to be flush with the tip end face 73c of the connection protruding portion 73. In the third embodiment, the core exposed portion 74a is flush with the flat surface 79a. As a manufacturing method for realizing the above configurations, there is a method of performing a finishing step of removing the gate remaining portion 74 after cutting the gate portion 101 in the molded body 100.

As Modification 2, the gate remaining portion 74 and the core exposed portion 74a may be provided at a position extending across a boundary portion between the upstream chamfered surface 73a and the tip end face 73c and a boundary portion between the downstream chamfered surface 73b and the tip end face 73c in the axial direction X in the connection protruding portion 73. In addition, at least a part of the gate remaining portion 74 and the core exposed portion 74a may be provided in the gate installation prohibition range.

As Modification 3, at least a part of the gate remaining portion 74 and the core exposed portion 74a may be provided on the sliding surface 78 side of the bottom portion 71 in the radial direction Y. Further, the gate remaining portion 74 and the core exposed portion 74a may be provided at a boundary portion between the connection surface 79 and the seat surface 77 or at a boundary portion between the connection surface 79 and the sliding surface 78 if the gate remaining portion 74 and the core exposed portion 74a are not included in the seat surface 77 or the sliding surface 78.

As Modification 4, the valve body 7 may have a columnar shape as long as the valve body 7 has the seat surface 77 and the sliding surface 78 on the outer surface 76 of the valve body 7. For example, the pressure release passage 13 is not provided in the valve body 7, and the spring 70 is provided between the upstream end face of the valve body 7 and the mounting portion 60. Similarly, in the above configuration, the seat surface 77 is included in the downstream end face of the valve body 7.

As Modification 5, the connection protruding portion 73 may be provided at a position spaced toward the upstream side from the downstream end portion of the connection surface 79. In that case, the downstream end face of the tubular wall portion 72 forms the seat surface 77, while the downstream end face of the connection protruding portion 73 does not form the seat surface 77. Further, the chamfered surfaces 73a and 73b of the connection protruding portion 73 may not be inclined surfaces extending straight from the tip end face 73c, but may be curved surfaces bulging toward the radially outer side or curved surfaces recessed toward the radially inner side. Further, the diameter R21 of the upstream end portion of the upstream chamfered surface 73a may be larger than the diameter R1 of the flat surface 79a, and the diameter R22 of the downstream end of the downstream chamfered surface 73b may be equal to or smaller than the diameter R1 of the flat surface 79a.

As Modification 6, the valve body 7 does not need to have the connection protruding portion 73. In that case, the configuration is such that the gate remaining portion 74 and the core exposed portion 74a are provided on the tubular wall portion 72.

As Modification 7, the gate remaining portion 74 and the core exposed portion 74a may not be annularly formed. In other words, the gate 92a which is a film gate in the mold device 90 does not need to be annular. For example, when the gate 92a is a pin gate, the gate remaining portion 74 may extend in a columnar shape from the connection surface 79 toward the radially outer side of the valve body 7.

As Modification 8, in the molded body 100, multiple gate portions 101 connected to the valve body 7 may be provided. In other words, the multiple gate remaining portions 74 and the multiple core exposed portions 74a may be provided on the connection surface 79 of the valve body 7. For example, the multiple gate remaining portions 74 may be aligned in the axial direction X on the connection surface 79.

In the embodiment described above, the inlet passage 11 is a passage that passes through the mounting portion 60 of the support member 6 in the axial direction X, and is provided inside the tubular end portion 2a. As Modification 9, the inlet passage 11 is not limited to the configuration described above, and may be configured by, for example, a passage that penetrates through the tubular end portion 2a in the radial direction Y and connects the outside and the valve chamber 22.

As Modification 10, the working fluid flowing through the electromagnetic valve 1 may be a liquid having a high viscosity in addition to oil.

As Modification 11, a sealing member such as an O-ring seal may be mounted on the outer periphery of the tubular end portion 2a in order to prevent the leakage of fluid from a space between the outer surface of the housing 2 and the inner surface of the mounting hole 52. For example, the O-ring seals are provided at a position on the tip side of the outflow port 12 and at a position on the rear end side of the outflow port 12. The O-ring seal is a rubber-made member having a circular cross section, and the O-ring seal is fitted into a groove provided in the entire circumference of the tubular end portion 2a. The sealing member may be made of an elastically deformable material other than rubber, and may have a rectangular cross-sectional shape.

As Modification 12, the number and shape of the pressure release passage 13 is not limited if the pressure release passage 13 is provided at a position other than a portion with which the shaft 4 comes in contact at the bottom portion 71. The pressure release passage 13 may have a rectangular, circular, arcuate, or slit cross-sectional shape. The portion of the valve body 7 pressed by the shaft 4 does not have to be the bottom portion 71, For example, a partition portion which is provided at a position in the valve body 7 which is separated from the seat surface 77 toward the sliding surface 78 side and partitions an internal space of the valve body 7 may be pressed by the shaft 4.

As Modification 13, the support portion 61 may be included in the housing 2 instead of being included in the support member 6 which is a member independent of the housing 2. For example, the support member 6 has the mounting portion 60, and at the time of manufacturing the electromagnetic valve 1, the support member 6 is attached to the downstream side of the support portion 61 within the tubular end portion 2a after the valve body 7 has been inserted into the inside of the support portion 61 of the housing 2.

As Modification 14, the control valve does not have to be the electromagnetic valve 1 having the electromagnetic solenoid unit 3 as a drive unit as long as the control valve is configured to be able to open and close the downstream valve port 25 by the seat surface 77 of the valve body 7. For example, a control valve having a drive unit including a piezoelectric element or a drive unit using a hydraulic pressure as a driving source may be used as a drive unit for opening and closing the valve body 7, (Overview)

A control valve controls the flow of the working fluid flowing from an upstream passage to a downstream passage through a valve chamber. The control valve has a valve body that is slidably supported by a support portion in a valve chamber. The valve body slides with respect to the support portion so that the valve body moves between an open position at which a valve port of the valve chamber is open to permit the flow of the working fluid from the valve chamber to the downstream passage and a closed position at which the valve port is closed to prevent the flow of the working fluid. An outer surface of the valve body includes a seat surface that closes the valve port and a sliding surface that slides on an inner surface of the support portion.

When the valve body is molded with resin using a mold device such as a mold, in the mold device, molten resin is supplied from a gate to a cavity in which the valve body is molded. The molded body molded by the mold device includes, in addition to the valve body, a portion where the molten resin remaining on the gate has solidified, which is a gate portion connected to the valve body, and the valve body is removed from the molded body by cutting the gate portion. In that case, a part of the gate portion may remain in the valve body as a trace of the cut of the gate portion.

When the molded body molded with resin has a skin layer molded by an inner peripheral surface of the mold device and a core layer provided inside the skin layer, a most part of the surface of the valve body is a smooth surface formed by the skin layer. On the other hand, it is expected that the core layer is exposed at a portion where the gate portion remains in the valve body and does not have a smooth surface. For that reason, if the remainder of the gate portion is on the seat surface or the sliding surface, there is a concern that a sealing property of the valve port by the valve body and a sliding property of the valve body with respect to the support portion are lowered by those of the remainder of the gate portion.

According to a control valve and a method for manufacturing the control valve of the present disclosure, a sealing property and a sliding property of the valve body can be improved while the number of working steps in manufacturing a valve body can be reduced.

According to a first aspect of the present disclosure, a control valve controls a flow of a working fluid. The control valve includes a housing, an inlet passage, a valve body and a support portion. The housing includes a tubular end portion inserted into a mounting hole of a passage formation member, and a valve chamber inside the tubular end portion. The passage formation member has an upstream passage through which the working fluid flows toward the housing, and a downstream passage into which the working fluid flows out of the housing. The inlet passage is provided inside or in the tubular end portion, and the upstream passage communicates with the valve chamber through the inlet passage. The valve body has a tubular or columnar shape, is provided in the valve chamber and is movable in an axial direction along which a center line of the valve body extends. The valve body includes a seat surface which is one end face for closing a valve port communicating with the valve chamber. The valve body is movable between an open position at which the valve port is open to permit a flow of the working fluid into the downstream passage from the valve chamber and a closed position at which the valve port is closed by the seat surface to block the flow. The support portion is provided in the valve chamber and supporting the valve body to be slidable in the axial direction. An outer surface of the valve body includes a sliding surface sliding on an inner peripheral surface of the support portion, and a connection surface connecting the seat surface and the sliding surface and being at a position not sliding on the inner peripheral surface. The valve body, which is a resin molded product, has a skin layer providing the outer surface and a core layer under the skin layer. The valve body includes a core exposed portion where the core layer is exposed without being covered with the skin layer and forms a part of the outer surface is provided on the connection surface without being provided on the seat surface and the sliding surface.

According to the first aspect, in the resin molded valve body, the core exposed portion is provided on the connection surface, while the core exposed portion is not provided on the seat surface and the sliding surface. For that reason, when the valve body is at the closed position, the deterioration of the sealing property of the valve port by the seat surface due to the core exposed portion can be reduced. In addition, when the sliding surface of the valve body slides with respect to the inner surface of the support portion, the deterioration of the sliding property of the valve body due to the core exposed portion can be reduced.

When the valve body is manufactured by resin molding using a mold device such as a mold, it is assumed that a trace of cutting a gate portion connected to the valve body remains on the valve body, and a core exposed portion is formed by the trace. On the other hand, as described above, since the core exposed portion is provided on the connection surface and is not provided on the seat surface and the sliding surface, there is no need to perform the work of making the core exposed portion as smooth as the seat surface and the sliding surface by performing finishing processing or the like on the outer surface of the valve body.

As described above, the sealing property and the sliding property of the valve body can be improved while the number of working steps in manufacturing the valve body can be reduced.

According to a second aspect of the present disclosure, in a method for manufacturing a control valve that controls a flow of a working fluid, a mold device including a cavity and a gate connected to the cavity is prepared. A molded body is molded by suppling molten resin from the gate to the cavity in the mold device. The molded body includes a tubular or columnar valve body and a gate portion. An outer surface of the valve body includes a seat surface which is one end face of the valve body, a connection surface extending from the seat surface in an axial direction of the valve body, and a sliding surface extending from the connection surface away from the seat surface in the axial direction. The gate portion is where the molten resin remaining in the gate has solidified, and the gate portion is connected to the connection surface without being connected to the seat surface and the sliding surface. The gate portion is cut off from the molded body to obtain the valve body with a gate trace remaining on the connection surface due to the cutting of the gate portion. A housing having a valve chamber is prepared. The valve body is placed in the valve chamber such that the sliding surface slides on an inner peripheral surface of a support portion supporting the valve body to be slidable in the axial direction while the connection surface does not slide on the inner peripheral surface of the support portion. A drive unit that moves the valve body in the axial direction is prepared. The drive unit is attached to the housing such that the valve body is movable between an open position at which a valve port communicating with the valve chamber is open, and a closed position at which the seat surface closes the valve port.

According to the second aspect, after the molded body is molded by using the mold device, the gate portion is cut. The gate trace, which is a trace of cutting the gate portion, remains on the connection surface on the outer surface of the valve body, but does not remain on the seat surface or the sliding surface. For that reason, similarly to the first aspect, the sealing property and the sliding property of the valve body can be improved while the number of working steps in manufacturing the valve body can be reduced.

While the present disclosure has been described with reference to various exemplary embodiments thereof, it is to be understood that the disclosure is not limited to the disclosed embodiments and constructions. To the contrary, the disclosure is intended to cover various modifications and equivalent arrangements. In addition, while the various elements of the disclosure are shown in various combinations and configurations, which are exemplary, other various combinations and configurations, including more, less or only a single element, are also within the spirit of the disclosure.

What is claimed is:

1. A control valve that controls a flow of a working fluid, comprising:
a housing that includes a tubular end portion inserted into a mounting hole of a passage formation member, and a valve chamber inside the tubular end portion, the passage formation member having an upstream passage through which the working fluid flows toward the housing, and a downstream passage into which the working fluid flows out of the housing;

an inlet passage provided inside or in the tubular end portion, the upstream passage communicating with the valve chamber through the inlet passage;

a valve body having a tubular or columnar shape, provided in the valve chamber and movable in an axial direction along which a center line of the valve body extends, the valve body including a seat surface which is one end face for closing a valve port communicating with the valve chamber, the valve body being movable between an open position at which the valve port is open to permit a flow of the working fluid into the downstream passage from the valve chamber and a closed position at which the valve port is closed by the seat surface to block the flow; and a support portion provided in the valve chamber and supporting the valve body to be slidable in the axial direction, wherein an outer surface of the valve body includes a sliding surface sliding on an inner peripheral surface of the support portion, and a connection surface connecting the seat surface and the sliding surface and being at a position not sliding on the inner peripheral surface, the valve body, which is a resin molded product, has a skin layer providing the outer surface and a core layer under the skin layer, the valve body includes a core exposed portion where the core layer is exposed without being covered with the skin layer and forms a part of the outer surface is provided on the connection surface without being provided on the seat surface and the sliding surface, the valve body has a projection portion which is a part of the connection surface protruding outward of the sliding surface in a direction orthogonal to the axial direction, the core exposed portion is on an outer surface of the projection portion, the valve body includes an annular protruding portion being at a position adjacent to the seat surface on the connection surface, protruding outward of the sliding surface in the direction orthogonal to the axial direction, and extending annularly around the center line, and the projection portion protrudes from the annular protruding portion in the direction orthogonal to the axial direction.

2. The control valve according to claim 1, wherein the core exposed portion extends annularly about the center line.

3. The control valve according to claim 1, wherein the valve body includes
   a tubular wall portion forming the sliding surface and the connection surface, and
   a bottom portion disposed at one end of the tubular wall portion and forming the seat surface together with the tubular wall portion, and
   at least a part of the core exposed portion and the bottom portion are aligned in a direction orthogonal to the axial direction.

4. The control valve according to claim 1, wherein the core exposed portion is provided at a position on the connection surface away from each of the seat surface and the sliding surface.

5. The control valve according to claim 1, wherein the valve body has a resin portion and a glass fiber mixed as a filler with the resin portion, and
a cut surface of the glass fiber is exposed in the core exposed portion.

6. A control valve that controls a flow of a working fluid, comprising:
   a housing including a tubular end portion, a valve chamber inside the tubular end portion, and an outflow port through which the working fluid flows out of the valve chamber;
   a valve body provided in the valve chamber and having a tubular or columnar shape, the valve body including a seat surface on one end face of the valve body; and
   a support member including a support portion provided in the valve chamber and having an inner peripheral surface supporting an outer surface of the valve body to be slidable in an axial direction of the valve body, wherein
   the valve body is slidable in the axial direction on the inner peripheral surface of the support portion between an open position at which the outflow port is open and a closed position at which the seat surface contacts the housing to close the outflow port,
   the valve body, which is a resin molded product, includes a skin layer forming the outer surface of the valve body, and a core layer under the skin layer,
   the outer surface of the valve body includes a core exposed portion where the core layer is exposed without being covered with the skin layer,
   the core exposed portion is at a position outside the seat surface and a slidable area of the outer surface which is slidable on the inner peripheral surface of the support portion,
   the outer surface of the valve body includes a connection surface connecting the seat surface and the slidable area,
   the valve body has a projection portion which is a part of the connection surface protruding outward of the slidable area in a direction orthogonal to the axial direction,
   the core exposed portion is on an outer surface of the projection portion,
   the valve body includes an annular protruding portion being at a position adjacent to the seat surface on the connection surface, protruding outward of the slidable area in the direction orthogonal to the axial direction, and extending annularly around a center line of the valve body, and
   the projection portion protrudes from the annular protruding portion in the direction orthogonal to the axial direction.

7. A control valve that controls a flow of a working fluid, comprising:
   a housing that includes a tubular end portion inserted into a mounting hole of a passage formation member, and a valve chamber inside the tubular end portion, the passage formation member having an upstream passage through which the working fluid flows toward the housing, and a downstream passage into which the working fluid flows out of the housing;
   an inlet passage provided inside or in the tubular end portion, the upstream passage communicating with the valve chamber through the inlet passage;
   a valve body having a tubular or columnar shape, provided in the valve chamber and movable in an axial direction along which a center line of the valve body extends, the valve body including a seat surface which is one end face for closing a valve port communicating with the valve chamber, the valve body being movable between an open position at which the valve port is open to permit a flow of the working fluid into the downstream passage from the valve chamber and a closed position at which the valve port is closed by the seat surface to block the flow; and a support portion provided in the valve chamber and supporting the valve body to be slidable in the axial direction, wherein an outer surface of the valve body includes a sliding surface sliding on an inner peripheral surface of the support portion, and a connection surface connecting the seat surface and the sliding surface and being at a position not sliding on the inner peripheral surface, the valve body, which is a resin molded product, has a skin layer providing the outer surface and a core layer under the skin layer, the valve body includes a core exposed portion where the core layer is exposed without being covered with the skin layer and forms a part of the outer surface is provided on the connection surface without being provided on the seat surface and the sliding surface, the valve body has a resin portion and a glass fiber mixed as a filler with the resin portion, and a cut surface of the glass fiber is exposed in the core exposed portion.

8. A control valve that controls a flow of a working fluid, comprising:

a housing including a tubular end portion, a valve chamber inside the tubular end portion, and an outflow port through which the working fluid flows out of the valve chamber;

a valve body provided in the valve chamber and having a tubular or columnar shape, the valve body including a seat surface on one end face of the valve body; and a support member including a support portion provided in the valve chamber and having an inner peripheral surface supporting an outer surface of the valve body to be slidable in an axial direction of the valve body, wherein the valve body is slidable in the axial direction on the inner peripheral surface of the support portion between an open position at which the outflow port is open and a closed position at which the seat surface contacts the housing to close the outflow port, the valve body, which is a resin molded product, includes a skin layer forming the outer surface of the valve body, and a core layer under the skin layer, the outer surface of the valve body includes a core exposed portion where the core layer is exposed without being covered with the skin layer, the core exposed portion is at a position outside the seat surface and a slidable area of the outer surface which is slidable on the inner peripheral surface of the support portion, the valve body has a resin portion and a glass fiber mixed as a filler with the resin portion, and a cut surface of the glass fiber is exposed in the core exposed portion.

* * * * *